US009671966B2

(12) United States Patent
Miwa et al.

(10) Patent No.: US 9,671,966 B2
(45) Date of Patent: Jun. 6, 2017

(54) MANAGEMENT COMPUTER AND COMPUTER SYSTEM

(71) Applicant: HITACHI, LTD., Tokyo (JP)

(72) Inventors: Kyoko Miwa, Tokyo (JP); Hironori Emaru, Tokyo (JP); Yukinori Sakashita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 17 days.

(21) Appl. No.: 14/896,226

(22) PCT Filed: Mar. 27, 2014

(86) PCT No.: PCT/JP2014/058930
§ 371 (c)(1),
(2) Date: Dec. 4, 2015

(87) PCT Pub. No.: WO2015/145680
PCT Pub. Date: Oct. 1, 2015

(65) Prior Publication Data
US 2016/0117122 A1 Apr. 28, 2016

(51) Int. Cl.
G06F 12/00 (2006.01)
G06F 3/06 (2006.01)
G06F 13/10 (2006.01)
G06F 9/455 (2006.01)

(52) U.S. Cl.
CPC .......... *G06F 3/0619* (2013.01); *G06F 3/06* (2013.01); *G06F 3/065* (2013.01); *G06F 3/0644* (2013.01); *G06F 3/0665* (2013.01); *G06F 3/0673* (2013.01); *G06F 9/45558* (2013.01); *G06F 13/10* (2013.01); *G06F 2009/45583* (2013.01)

(58) Field of Classification Search
None
See application file for complete search history.

(56) References Cited

U.S. PATENT DOCUMENTS

2008/0195827 A1* 8/2008 Saika ................. G06F 11/1458
711/162
2010/0106688 A1 4/2010 Higuchi et al.
2011/0071983 A1 3/2011 Murase
2011/0088029 A1 4/2011 Murase

FOREIGN PATENT DOCUMENTS

JP 2010-102479 A 5/2010
JP 2011-070627 A 4/2011
JP 2011-086274 A 4/2011

* cited by examiner

*Primary Examiner* — Brian Peugh
(74) *Attorney, Agent, or Firm* — Volpe and Koenig, P.C.

(57) ABSTRACT

The management computer includes a memory and a processor. The processor recognizes a state of a storage system that provides a first volume as a logical volume that stores a first image of an object. The processor generates a second volume as a virtual logical volume that stores a second image of the object. The processor selects, based on the state, one generation processing from a plurality of generation processing including: first generation processing of associating the second volume with the first image and differential data from the first image to provide the second volume; and second generation processing of generating the second volume as a logical volume and copying the first image to the second volume to provide the second volume. The processor transmits an instruction to execute the selected generation processing to the storage system.

15 Claims, 24 Drawing Sheets

FIG. 6

| LDEV ID | Volume Type | GI LDEV ID | SSID | Pool ID | Capacity |
|---------|-------------|------------|------|---------|----------|
| VOL1 | GI | - | - | - | 30G |
| VOL2 | SS | VOL1 | SS1 | Pool1 | 30G |
| VOL3 | SS | VOL1 | SS2 | Pool1 | 30G |
| VOL4 | SS | VOL1 | SS2-1 | Pool2 | 30G |
| VOL10 | GI | - | - | - | 50G |
| VOL11 | SS | VOL10 | SS1 | Pool1 | 50G |
| VOL12 | SS | VOL10 | SS2 | Pool1 | 50G |
| ... | ... | ... | ... | ... | ... |
| VOL100 | Basic | - | - | - | 50G |
| ... | ... | ... | ... | ... | ... |

Logical volume management table

FIG. 7

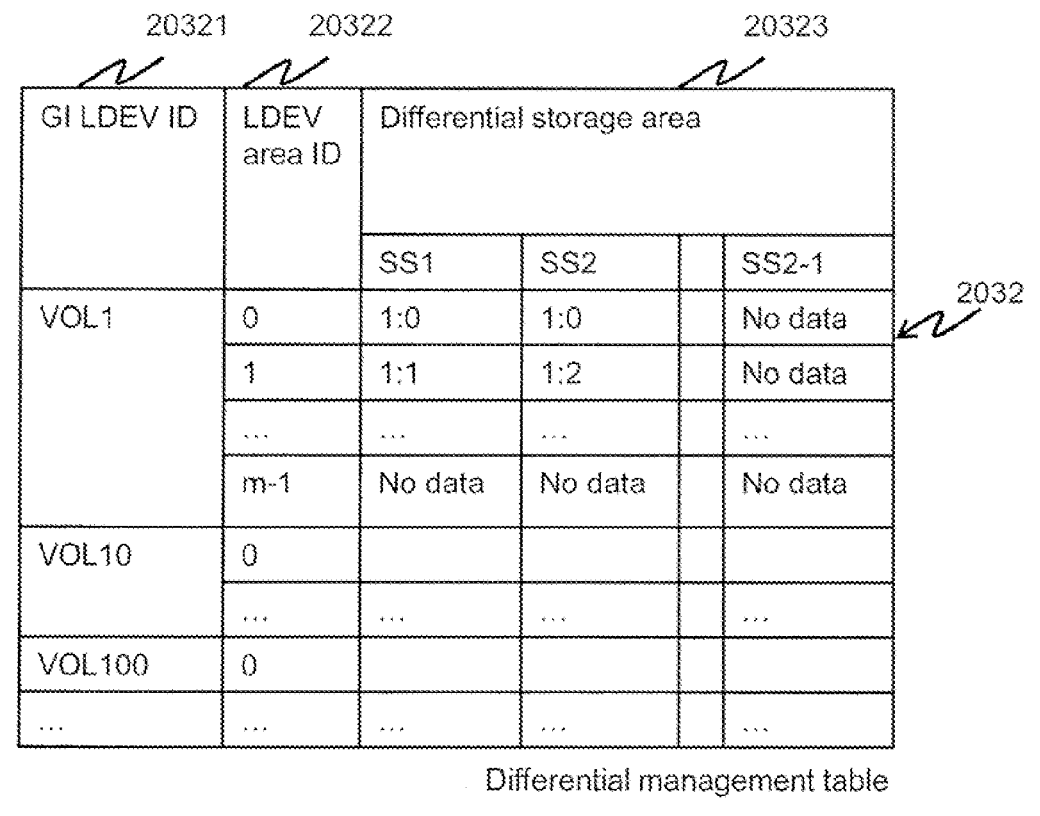

| GI LDEV ID | LDEV area ID | Differential storage area | | | |
|---|---|---|---|---|---|
| | | SS1 | SS2 | ... | SS2-1 |
| VOL1 | 0 | 1:0 | 1:0 | | No data |
| | 1 | 1:1 | 1:2 | | No data |
| | ... | ... | ... | | ... |
| | m-1 | No data | No data | | No data |
| VOL10 | 0 | | | | |
| | ... | ... | ... | | ... |
| VOL100 | 0 | | | | |
| ... | ... | ... | ... | | ... |

Differential management table

FIG. 8

| Pool ID | Pool capacity | Pool remaining capacity |
|---------|---------------|-------------------------|
| Pool1   | 5TB           | 3TB                     |
| Pool2   | 5TB           | 2TB                     |
| Pool3   | 10TB          | 8TB                     |
| ...     | ...           | ...                     |

20331, 20332, 20333, 2033

Pool management table

Logical volume management table

FIG. 11

| GI ID | Storage ID | LDEV ID | Response time | GI Group ID |
|---|---|---|---|---|
| 1 | 1 | VOL1 | 2 | 1 |
| 2 | 1 | VOL10 | 3 | 1 |
| 3 | 1 | VOL100 | 5 | 2 |
| ... | ... | ... | | ... |

GI management table

FIG. 12

| SS ID | Storage ID 40131 | LDEV ID 40132 | GI ID 40133 | Pool ID 40134 | Differential amount 40135 | GI access frequency 40136 | Pool access frequency 40137 | Allocated host 40138 | VM ID 40139 | Request response time 401390 |
|---|---|---|---|---|---|---|---|---|---|---|
| 1 | 1 | 2 | 1 | 1 | 5G | 1000 | 300 | Host1 | VM 1 | 1 |
| 2 | 1 | 3 | 1 | 1 | 2G | 800 | 1200 | Host1 | VM 2 | 3 |
| 3 | 1 | 4 | 1 | 1 | 3G | 400 | 1000 | Host2 | VM 3 | 5 |
| ... | | | | | | | | | | |

SS management table 4013

FIG. 13

| Pool ID | Storage ID | Pool capacity | Pool remaining capacity | Response time | Operating rate |
|---|---|---|---|---|---|
| Pool1 | ST1 | 5T | 3T | 1 | 70% |
| Pool2 | ST1 | 5T | 2T | 2 | 50% |
| Pool3 | ST1 | 10T | 8T | 3 | 20% |
| ... | ... | ... | ... | ... | ... |

Pool management table

FIG. 22

| Template ID | Template Name | GI ID | Virtual machine | Clone generation method |
|---|---|---|---|---|
| 1 | Business A | 1 | Web server | Snapshot |
| | | 2 | App server | Snapshot |
| | | 3 | DB server | Full Clone |
| | | ⋮ | ⋮ | ⋮ |
| 2 | | | | |

MANAGEMENT COMPUTER AND COMPUTER SYSTEM

TECHNICAL FIELD

This invention is concerning a technique of managing an object in a storage apparatus.

BACKGROUND ART

Due to the recent improvement of the performance of physical computers, for example, a plurality of virtual computers (virtual machine: hereinafter, also referred to as VM as appropriate) can be operated on the physical computer.

In a known computer system, a plurality of users can each update a snapshot (Writable SnapShot, hereinafter, referred to as WSS as appropriate) that can be updated in a virtual environment (e.g., PTL 1). In PTL 1, the computer system includes a NAS OS (Network Attached Storage Operating System) having a WSS function, and the NAS OS provides a plurality of virtual NASs to each domain. The plurality of virtual NASs use the same original data, and each virtual NAS manages a differential corresponding to update data, whereby each domain can update the snapshot.

CITATION LIST

Patent Literature

[PTL 1]
Japanese Patent Application Publication No. 2010-102479

SUMMARY OF INVENTION

Technical Problem

When data of an object, such as the VM, is provided to a host computer with the above-described WSS function, a plurality of snapshots, based on a golden image as a template of original data for providing the object, is generated, whereby a plurality of the objects are provided. When the object is updated, the differential data of each object is associated with each snapshot.

In such a situation, when a copy (clone) of the object is generated, an object needs to be newly generated based on the golden image and the differential data. Thus, the required capacity ends up being the same as that in a case of copying an object generated without using the WSS function, and thus efficiency is low.

The present invention is made in view of the situation described above, and provides a computer system management technique for determining a clone generation method for an object.

Solution to Problem

To solve the problem described above, a management computer according to the present invention includes a memory and a processor coupled to a storage system that provides a first volume as a logical volume that stores a first image of an object and to the memory. The processor recognizes a state of the storage system that provides the first volume as the logical volume that stores the first image of the object. The processor selects, based on the state of the storage system, one generation processing from a plurality of generation processing, which is processing including first generation processing and second generation processing executed by the storage system, and transmits an instruction to execute the selected generation processing to the storage system. The first generation processing is processing in which the storage system generates a second volume as a virtual logical volume that stores a second image of the object, and associates the second volume with the first image and differential data from the first image to provide the second volume. The second generation processing is processing in which the storage system generates the second volume as a logical volume and copies the first image to the second volume to provide the second volume.

Advantageous Effects of Invention

With the present invention, a clone of an object can be generated with an appropriate method suitable for a configuration and a performance of a storage.

BRIEF DESCRIPTION OF DRAWINGS

FIG. 6 illustrates a logical volume management table 2031.
FIG. 7 illustrates a differential management table 2032.
FIG. 8 illustrates a pool management table 2033.
FIG. 11 illustrates a GI management table 4012.
FIG. 12 illustrates an SS management table 4013.
FIG. 13 illustrates a pool management table 4014.
FIG. 22 illustrates template management table 4016.

DESCRIPTION OF EMBODIMENTS

Figure 1:
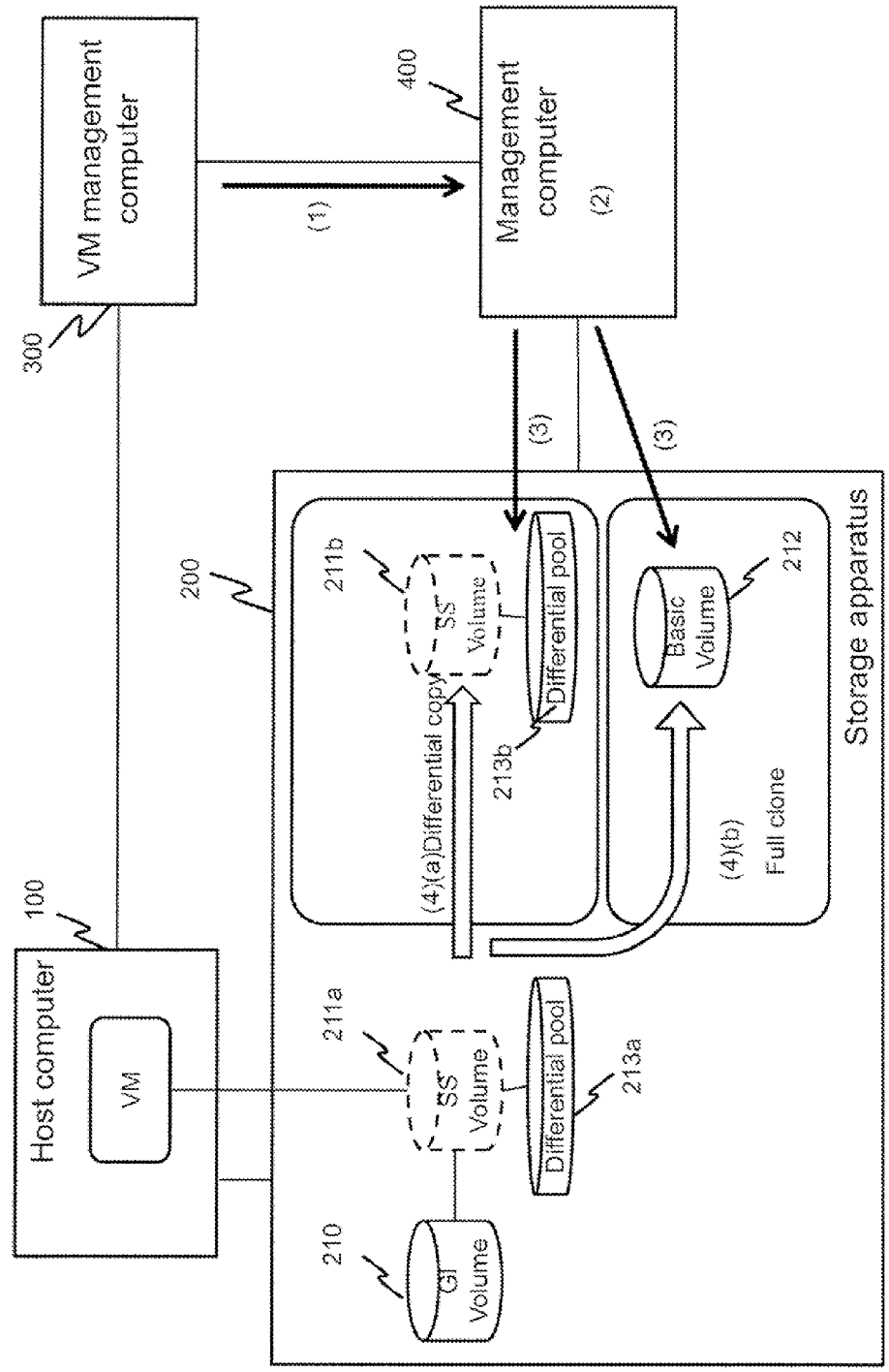
FIG. 1 is a diagram illustrating an overview of a clone generation method according to a first embodiment.

Some embodiments are described below with reference to the drawings. The embodiments below do not limit the scope of the invention defined in the appended claims, and the elements and their combinations described in the embodiments are not necessarily essential for achieving the invention.

In the following description, various pieces of information may be described as "aaa table". However, the various pieces of information may be described as a data structure other than tables. Furthermore, "aaa table" may be referred to as "aaa information" to show that the information does not depend on a data structure. Information elements including various values in a table are referred to as entries.

Elements common to several figures are denoted with the same reference numerals. To differentiate individual elements categorized as the common elements, their reference numerals are followed by individual characters, such as 1a, 2b. These characters may be omitted in the description as needed.

In the following description, a management computer, a host computer, or a program may be described as a subject of processing, which means that in this processing, the program is executed by a processor (e.g., Central Processing Unit: CPU) in a control device included in the management computer or the host computer. In a similar manner, when a storage apparatus is described as a subject of processing, a controller included in the storage apparatus executes the program. At least one of the control device and the controller may be the processor itself, or include a hardware circuit that executes the partial or entire processing performed by a control device or a controller.

The program may be installed from a program source to computers or a storage system. The program source may be, for example, a program distribution server or a storage medium.

First Embodiment

FIG. 1 is a diagram illustrating an overview of a clone generation method according to a first embodiment.

A computer system according to the present embodiment includes a host computer 100, a storage apparatus 200, a virtual machine management computer 300, and a management computer 400. In the following description and figures, the virtual machine management computer 300 is abbreviated as a VM management computer 300 as appropriate.

The storage apparatus 200 includes a golden image volume 210, a snapshot volume 211, and a differential pool 213. In the following description and figures, the golden image volume 210 is abbreviated as a GI volume 210 as appropriate. In the following description and figures, the snapshot volume 211 is abbreviated as an SS volume 211 as appropriate.

The SS volume 211 is a virtual volume that stores a snapshot provided to the host computer 100. The snapshot is image data based on a golden image in the GI volume 210 and differential data in the differential pool 213, and is a snapshot (WSS) that can be updated. With the snapshot in the SS volume 211, a virtual machine (VM, virtual computer) that is a virtual computer as an object is provided to the host computer 100. Other objects, such as an application executed on the host computer 100, may be used instead of the VM.

The GI volume 210 is a logical volume that stores a golden image. The golden image is templated VM data with which a VM operates on the host computer 100. More specifically, for example, the golden image is a program causing the VM to operate.

The differential pool 213 is a logical area that stores differential data between the golden image and predetermined VM data. More specifically, for example, the differential data is written to the differential pool 213 when the VM performs writing to the SS volume 211, or the like operation is performed.

Now, a case where a copy of the VM is generated is considered. When a clone of the VM is generated, a copy of a volume as a basis of the VM, that is, a copy of a volume that stores data as a basis of the VM is generated. The management computer 400 executes clone generation method determination processing of determining a clone generation method for the VM. In the present embodiment, the volume as the basis of the VM is the SS volume 211 or a Basic volume 212.

The clone generation method determination processing is executed when the management computer 400 receives a clone generation instruction from the VM management computer 300. The VM management computer 300 transmits the clone generation instruction to the management computer 400, when a user that manages the VM inputs an instruction to copy the data as the basis of the VM to another volume, or when a response performance of the storage apparatus 200 for the host computer 100 fails to satisfy a predetermined requirement, or the like. For example, the predetermined requirement is not satisfied when the response of the storage apparatus 200 is delayed over a predetermined level. Hereinafter, the clone generation method determination processing executed by the management computer 400 is described.

(1) The management computer 400 receives the clone generation instruction from the VM management computer 300.

(2) The management computer 400 receives the clone generation instruction and determines a clone generation method based on configuration information and performance information of the storage apparatus 200 or the like.

More specifically, in (2), any one of the following methods (a) to (d) is determined for generating a copy of the SS volume 211, for example. Although only the methods (a) and (b) described below are illustrated in FIG. 1, the methods (c) and (d) of changing the GI volume 210 associated with the SS volume 211 may be employed.

(a) This is a method in which the storage apparatus 200 generates a copy of the SS volume 211 by only copying the differential data in the differential pool 213, as the data to be the basis of the SS volume 211. In the following description and figures, this copy is referred to as a differential clone as appropriate. When the differential clone is generated, only the differential data is copied from a differential pool 213a as a copy source to a differential pool 213b as a copy destination. A copy destination SS volume 211b as the copy refers to the GI volume 210 and the differential pool 213b of the copy destination.

(b) This is a method in which the storage apparatus 200 generates a copy of the entire logical volume as the basis of the SS volume 211. In the following description and figures, this copy may be referred to as a full clone. In the following description and figures, a logical volume that stores the full clone is referred to as the Basic volume 212 as appropriate. When the full clone is generated, the VM data in the GI volume 210 is copied to the Basic volume 212, and the VM data in the Basic volume 212 is updated with the differential data in the differential pool 213a as the copy source. When the copy source is the Basic volume, the full clone of the Basic volume as the copy source may be generated in a Basic volume as the copy destination.

(c) This is a method in which, when a plurality of GI volumes store the same GI, the storage apparatus 200 generates the differential clone, and switches the GI volume 210 referred to by the SS volume 211b to be the copy destination to another GI volume that stores the same GI. The differential clone is generated in the same manner as that in (a).

(d) This is a method in which the storage apparatus 200 generates the differential clone, generates a new GI volume that stores the same GI as the GI volume referred to by the SS volume as the copy source, and switches the GI volume referred to by the SS volume 211b to be the copy destination to the new GI volume. The differential clone is generated in the same manner as that in (a).

(3) The management computer 400 transmits a clone generation command to the storage apparatus based on the result of the determination in (2). More specifically, any of the following clone generation command is transmitted.

When the method (a) is performed, the management computer 400 transmits to the storage apparatus 200, a command for copying he differential data to the differential pool 213b different from the differential pool 213a as the copy source.

When the method (b) is performed, the management computer 400 transmits to the storage apparatus 200, a command for generating the full clone of the SS volume 211 or the Basic volume 212.

When the method (c) is performed, the management computer 400 transmits to the storage apparatus 200, a command for copying the differential data to the differential pool 213b different from the differential pool 213a as the copy source, and for switching the referred GI volume 210.

When the method (d) is performed, the management computer 400 transmits to the storage apparatus 200, a command for copying the differential data to the differential pool 213b different from the differential pool 213a as the copy source, and for switching the reference destination to the new GI volume 210.

(4) The storage apparatus 200 generates a copy of the volume as the basis of the VM based on any one of the above-described commands (a) to (d). The volume (data) of the copy source may be deleted as needed.

In this example, for generating the copy of the volume as the basis of the VM, an appropriate clone generation method can be selected based on the configuration information and the performance information of the storage apparatus 200. Thus, the copy of the volume as the basis of the VM is always the full clone when the clone is generated, and thus the storage capacity can be prevented from being consumed over the expected level. All things considered, for an administrator that manages the system, the storage capacity required for storing data can be prevented from being unintentionally increased due to the clone generation. Thus, not only the cost for purchasing the storage capacity can be reduced, but also the management cost can be prevented from increasing due to the system expansion.

Figure 2:
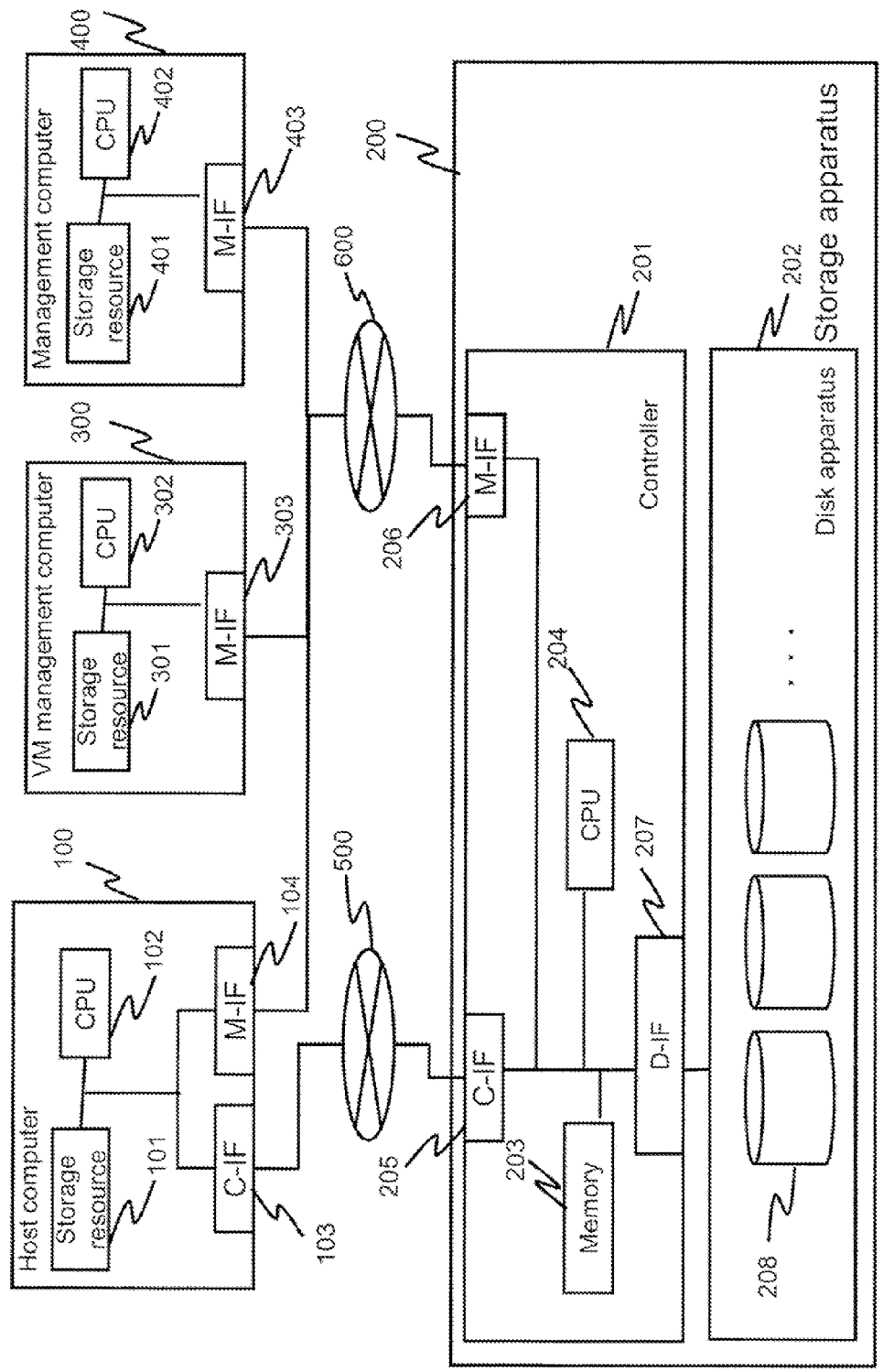
FIG. 2 is a diagram illustrating a configuration of the first embodiment.

FIG. 2 is a diagram illustrating a configuration of a computer system according to the first embodiment.

The computer system includes the host computer 100, the storage apparatus 200, the VM management computer 300, and the management computer 400.

The storage apparatus 200 is coupled to the VM management computer 300, the management computer 400, and the host computer 100 through a first communication network 600 such as a LAN (Local Area Network) for example. The storage apparatus 200 is coupled to the host computer 100 through a second communication network 500 such as a SAN (Storage Area Network) for example. The first communication network 600 and the second communication network 500 may be integrally formed.

The storage apparatus 200 includes a disk apparatus 202 and a controller 201 coupled to the disk apparatus 202.

The disk apparatus 202 includes one or more physical storage devices 208. An example of the physical storage device 208 includes but is not limited to a SAS (Serial Attached Small Computer System Interface)-HDD (Hard Disk Drive), a SATA (Serial Advanced Technology Attachment)-HDD, and an SSD (Solid State Drive). A semiconductor storage device may be used instead of the physical storage device 208. A plurality of the physical storage devices 208 may form a RAID (Redundant Arrays of Inexpensive Disks) group. One or a plurality of logical volumes may be provided to the host computer 100, based on one physical storage device 208 or the plurality of physical storage devices 208 forming one RAID group. One or more physical storage devices 208 may be provided from an unillustrated external storage apparatus.

The controller 201 includes a management interface (I/F) 206, a communication I/F 205, a device I/F 207, a memory 203, and a processor 204 coupled these components. In the following description and figures, the management I/F is referred to as an M-I/F as appropriate. In the following description and figures, the communication I/F is referred to as a C-I/F as appropriate. In the following description and figures, the device I/F is referred to as a D-I/F as appropriate.

The M-I/F 206 is a communication interface coupled to the first communication network 600 and is, for example, an NIC (Network Interface Card). The C-I/F 205 is a communication interface apparatus coupled to the second communication network 500. The D-I/F 207 is a communication interface apparatus for communicating with the disk apparatus 202. The controller 201 accesses the physical storage device 208 through the D-I/F 207. The D-I/F 207 may be provided for each type of the physical storage device.

The memory 203 stores various pieces of information such as a computer program executed by the processor (CPU) 204. The memory 203 includes a cache memory area. The cache memory area temporarily stores write data corresponding to a write command from the host computer 100, read data that is based on a read command from the host computer 100 and read from an actual data storage area (e.g., page) on the physical storage device, and the like. The write data in the cache memory area is stored in the physical storage device allocated to a virtual area as a write destination indicated by the write command. The read data in the cache memory area is provided by the host computer 100. The information and the program stored in the memory 203 will be described in detail later.

The host computer 100 includes a management interface (M-I/F) 104, a communication I/F (C-I/F) 103, a storage resource 101, a processor 102 coupled to these components, and an I/O device (not illustrated). The M-I/F 104 is an NIC for example, and the C-I/F 103 is an HBA (Host Bus Adapter) for example. The storage resource 101 is a memory for example, and may include an auxiliary storage apparatus such as an HDD (Hard Disk Drive). For example, the storage resource 101 stores an application program such as a business program and an OS (Operating System) executed by the processor 102. The I/O device includes an input unit that receives an input from the user and an output unit that displays various pieces of information to the user. The input unit is a keyboard, a switch, a pointing device, and/or a microphone for example, and the output unit is a display apparatus and/or a speaker for example.

The VM management computer 300 includes an M-I/F 303, a storage resource 301, a processor (CPU) 302 coupled to these components, and an I/O device (not illustrated). The M-I/F 303 is an NIC for example. The I/O device is similar to the I/O device of the host computer 100.

The storage resource 301 is a memory for example, and may include an auxiliary storage apparatus such as an HDD. The storage resource 301 stores a computer program and various pieces of information. The information stored in the storage resource 301 includes, for example, configuration information of the VM indicating a combination of the host computer 100 and the VM operating thereon, performance information of the VM indicating a response time of the storage apparatus from the perspective of the VM, and the like. For example, the response time is a time period between a point where the command is issued from the host computer 100 to the storage apparatus and a point where the host computer 100 receives a response to the command. Furthermore, the storage resource 301 manages a clone generation instruction program for instructing the management computer 400 to generate a clone in response to a VM data migration instruction from the user that manages the VM by using the VM management computer 300 or a result of monitoring the performance information such as the response time of the storage apparatus. Such a program is executed by the processor 302.

The management computer 400 includes an M-I/F 403, a storage resource 401, a processor (CPU) 402 coupled thereto, and an I/O device (not illustrated). The M-I/F 403 is an NIC for example. The I/O device is the same as the I/O device of the host computer 100.

The storage resource 401 is a memory for example, and may include an auxiliary storage apparatus such as an HDD. The storage resource 401 stores a computer program and various pieces of information. The computer program is executed by the processor 402. The information and the program stored in the storage resource 401 will be described in detail later.

The hardware configuration of the computer system according to the first embodiment is as described above. For example, the communication interface devices, such as the above-described M-I/F and C-I/F, may differ among the types of networks to which the I/F is coupled or the types of apparatuses including the I/F.

Figure 3:
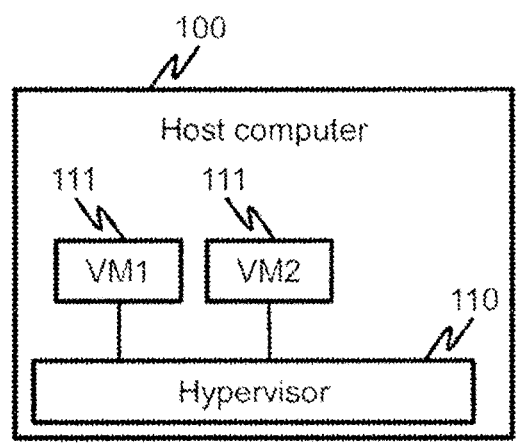
FIG. 3 is a diagram illustrating a logical configuration of a host computer 100.

FIG. 3 is a diagram illustrating a logical configuration of the host computer 100.

The host computer 100 includes a hypervisor (HV) 110. The HV 110 is a program that generates and executes a VM 111. The HV 110 can generate and control a plurality of VMs 111 at once. The plurality of VMs 111 can execute an application as if they are each a stand-alone physical computer.

In the figure, a line connecting between the VM and the HV is a line indicating that the VM is logically operating on the HV, and is not a line representing a connection on the network.

Figure 4:
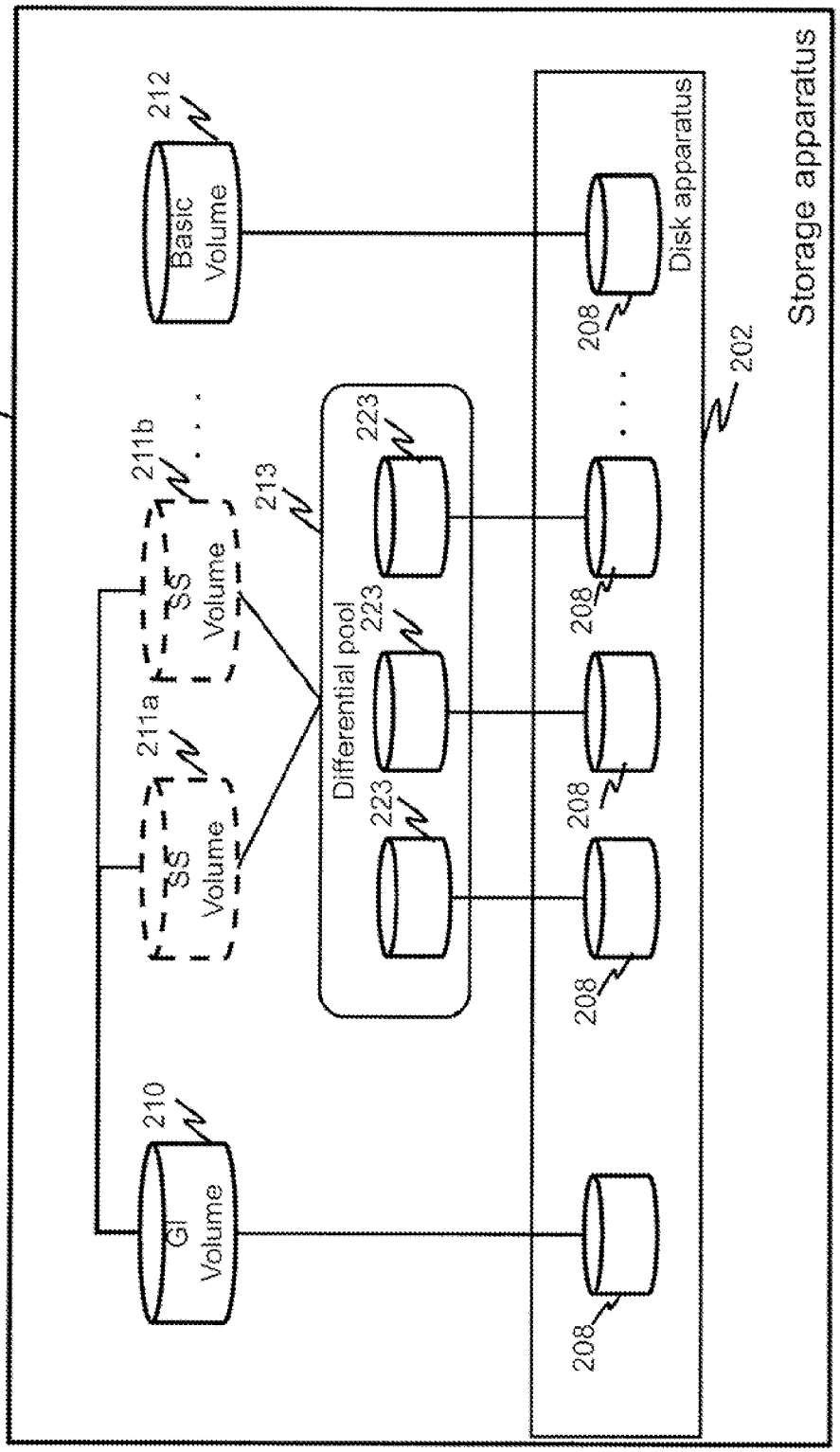
FIG. 4 is a diagram illustrating a configuration of a storage apparatus 200.

FIG. 4 is a diagram illustrating a configuration of volumes of the storage apparatus 200.

The controller 201 of the storage apparatus 200 generates the GI volume 210, the differential pool 213, and the Basic volume 212 based on one or more physical storage devices 208 of the disk apparatus 202. The controller 201 generates the SS volumes 211 based on the GI volume 210 and the differential pool 213.

The GI volume 210 is a logical volume based on a storage area of the physical storage device 208. The GI volume 210 may be a logical volume based on the RAID group including the plurality of physical storage devices 208. The GI volume 210 may also be a virtual logical volume obtained by Thin Provisioning in which an actual storage area of the physical storage device 208 is allocated in response to writing by the host computer 100.

The differential pool 213 is generated based on one or more physical storage devices 208. The differential pool 213 may include a differential volume based on the RAID group including the plurality of physical storage devices 208.

The Basic volume 212 is a logical volume provided to the host computer 100 based on the storage area of the physical storage device 208. The Basic volume 212 may be a logical volume based on the RAID group including the plurality of physical storage devices 208. The Basic volume 212 may also be a virtual logical volume obtained by Thin Provisioning in which the actual storage area of the physical storage device 208 is allocated in response to writing by the host computer 100.

The SS volume 211 is a virtual logical volume provided to the host computer 100 based on the GI volume 210 and the differential pool 213. In the following description, the GI volume 210 and/or the differential pool 213 as the basis of the SS volume 211 may be referred to as the GI volume 210 and/or the differential pool 213 associated with the SS volume 211 as appropriate. In the following description, the golden image in the GI volume 210 and/or the differential data in the differential pool 213 as the basis of the snapshot stored in the SS volume 211 may be referred to as the golden image and/or the differential data associated with the snapshot as appropriate. As described above, the SS volume 211 is a virtual logical volume that cannot exist independently from the GI volume 210. On the other hand, the Basic volume 212 is a logical volume that can exist independently from the GI volume 210.

In the present embodiment, the VM provided to the host computer 100 is based on the SS volume 211 or the Basic volume 212. Thus, in the present embodiment, the GI volume 210 is a logical volume that is used as a template of the VM data for generating the SS volume 211 or the Basic volume 212, and is described as not being a logical volume directly provided to the host computer 100. Still, the GI volume may be a volume directly provided to the host computer 100.

In the figure, lines connecting between various logical volumes and the physical storage device 208, and connecting between the SS volume 211 and the GI volume 210 are logical connection lines and are not lines representing the connection on the network.

Figure 5:
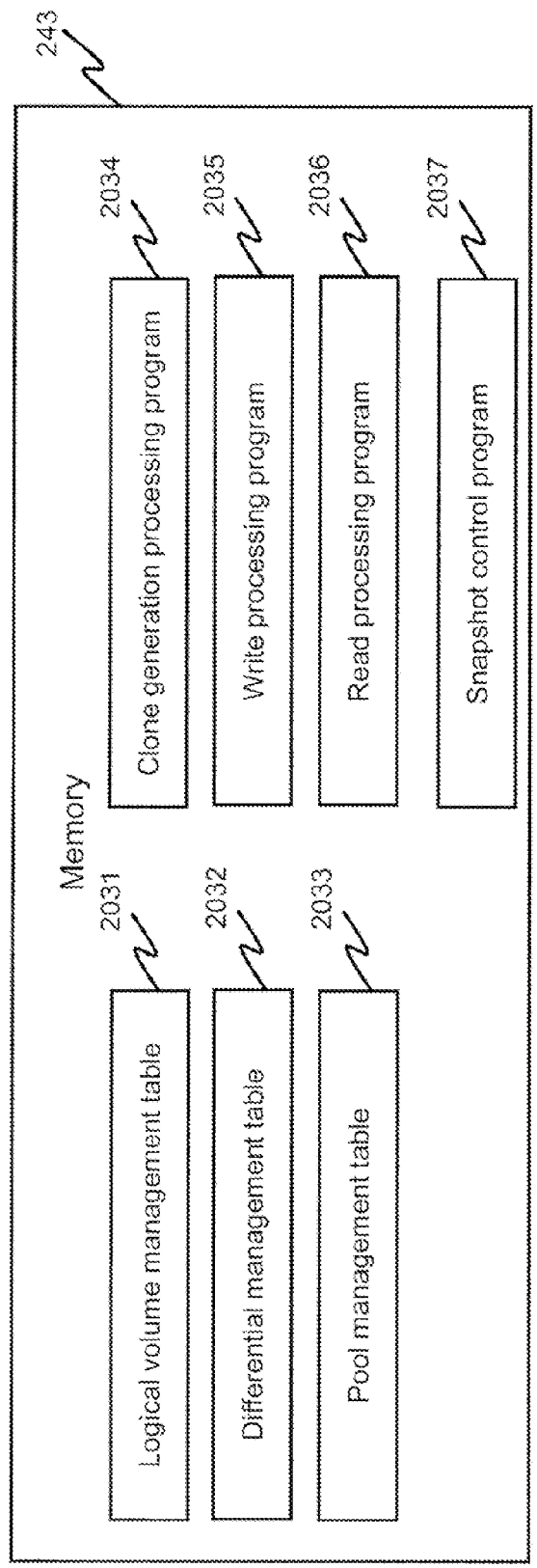
FIG. 5 illustrates information stored in a memory 203 of the storage apparatus 200.

FIG. 5 illustrates information stored in the memory 203 of the storage apparatus 200.

The memory 203 stores a logical volume management table 2031, a differential management table 2032, a pool management table 2033, a clone generation processing program 2034, a write processing program 2035, a read processing program 2036, and a snapshot control program 2037.

The clone generation processing program 2034 is a program executed by the CPU 204 when the clone generation command is transmitted from the management computer 400, and will be described in detail later.

The write processing program 2035 is a program executed by the CPU 204 when a data write instruction is transmitted from the host computer 100 to the SS volume 211, and will be described in detail later.

The read processing program 2036 is a program executed by the CPU 204 when a data read instruction is transmitted from the host computer 100 to the SS volume 211. With the program 2036, data is read from the storage area associated with a target block of the SS volume 211 designated by the data read instruction, and is transmitted to the host computer 100. More specifically, for example, when the data in the target block has not been updated, the program 2036 reads the data from the storage area of the GI volume 210 that stores the golden image and is associated with the target block. On the other hand, when the data in the target block has been updated, the program 2036 reads out the data from the storage area of the differential pool 213 that stores the differential data and is associated with the target block.

The snapshot control program 2037 is a program executed by the CPU 204 when the SS volume generation instruction is received from the management computer 400. Based on the SS volume generation instruction, the program 2037 generates the SS volume 211 based on the golden image in the GI volume 210. When the SS volume 211 is generated in the processing, the program 2037 sets the GI volume as the reference destination of the SS volume 211. By updating the SS volume 211, the reference destination of the SS volume 211 includes the differential pool 213.

FIG. 6 illustrates the logical volume management table 2031.

The logical volume management table 2031 is a table that stores information on the logical volumes in the storage apparatus 200. The logical volumes include virtual logical volumes associated with other logical volumes. The logical volume management table 2031 includes an entry for each logical volume in the storage apparatus 200.

LDEV ID 20311 indicates an ID for uniquely identifying the logical volume.

Volume Type 20312 stores a type of the logical volume. In the present embodiment, "GI" represents the GI volume 210, "SS" represents the SS volume 211, and "Basic" represents the Basic volume 212.

GI LDEV ID 20313 indicates an ID of the GI volume 210 associated with the SS volume 211 as the logical volume. The logical volumes as the GI volume 210 and the Basic volume 212 are provided with "–".

SSID 20314 indicates an ID for uniquely identifying the logical volume as the SS volume in the SS volumes 211 associated with the same GI volume 210. In the example illustrated in FIG. 6, two SS volumes "VOL2" and "VOL3" are generated based on a GI volume "VOL1", and are respectively provided with SSIDs "SS1" and "SS2" in the generated order.

Pool ID 20315 indicates an ID for uniquely identifying the differential pool 213 associated with the SS volume as the logical volume.

Capacity 20316 indicates a capacity of the logical volume.

FIG. 7 illustrates the differential management table 2032.

The differential management table 2032 is a table that stores information on the GI volumes 210 in the storage apparatus 200. In the present embodiment, the GI volume 210 is a volume having "GI" as the Volume Type 20312 in the logical volume management table 2031. The differential management table 2032 includes an entry for each storage area in the GI volume.

GI LDEV ID 20321 indicates an ID for uniquely identifying the GI volume 210 including the storage area.

LDEV area ID 20322 is a block address of the storage area in the GI volume 210.

Differential storage area 20323 indicates a position where the differential data is stored in the storage area. The area 20323 is divided into fields corresponding to the respective SSIDs. In the field of each SSID, the differential pool ID indicating the differential pool and the block address in the differential pool, are registered as the stored position of the differential data. In the illustrated example, the stored position of the differential data of the SS volume "SS1" corresponding to a storage area of a block address "0" of the GI volume "VOL1", in the SS volume "SS1" associated with the GI volume "VOL1" is represented by "1:0" indicating that the differential data of the SS volume "SS1" is stored in the storage area of the block address "0" of the differential pool "1". When there is no differential data, "no data" is stored. The read processing program 2036 refers to the table 2032 in the processing of reading data from the SS volume 211.

FIG. 8 illustrates the pool management table 2033.

The pool management table 2033 is a table that stores information on the differential pool 213 in the storage apparatus 200. The pool management table 2033 includes an entry for each differential pool 213.

Pool ID 20331 indicates an ID for uniquely identifying the differential pool 213.

Pool capacity 20332 indicates a total capacity of the differential pool 213.

Pool remaining capacity 20333 indicates a capacity of an unused area of the differential pool 213.

Figure 9:
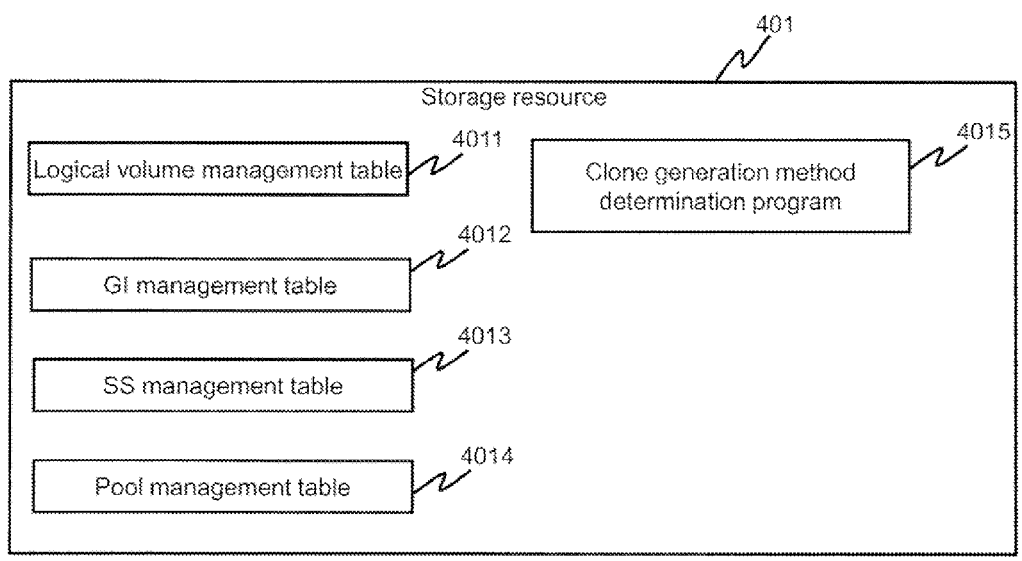
FIG. 9 illustrates information stored in a storage resource 401 of a management computer 400.

FIG. 9 illustrates information stored in the storage resource 401 of the management computer 400.

The storage resource 401 stores a logical volume management table 4011, a GI management table 4012, an SS management table 4013, a pool management table 4014, and a clone generation method determination program 4015.

Figure 10:
FIG. 10 illustrates a logical volume management table 4011.

FIG. 10 illustrates the logical volume management table 4011.

The logical volume management table 4011 is a table that stores information on a logical volume of the storage apparatus 200 as a management target of the management computer 400. The logical volume management table 4011 includes an entry for each logical volume.

LDEV ID 40111 indicates an ID for uniquely identifying the logical volume.

Storage ID 40112 is an ID for uniquely identifying the storage apparatus 200 including the logical volume.

Volume Type 20312 indicates a type of the logical volume. In the present embodiment, "GI" represents the GI volume 210, "SS" represents the SS volume 211, and "Basic" represents the Basic volume 212.

Capacity 20316 indicates a total capacity of the logical volume.

FIG. 11 illustrates the GI management table 4012.

The GI management table 4012 is a table that stores information on a golden image of the storage apparatus managed by the management computer 400. The GI management table 4012 includes an entry for each golden image.

GI ID 40121 indicates an ID for uniquely identifying the golden image.

Storage ID 40122 indicates an ID for uniquely identifying the storage apparatus 200 including the golden image.

LDEV ID 40123 indicates an ID for uniquely identifying the GI volume 210 that stores the golden image. More specifically, the golden image is identified by the GI ID 40121 and is stored in the logical volume identified by the Storage ID 40122 and the LDEV ID 40123.

Response time 40124 indicates a time period between a point where a command is issued from the host computer 100 to the storage apparatus 200 and a point where an access is made to the GI volume 210 as the stored destination of the golden image to receive a response to the command, for example. The response time 40124 may be a static response time (catalogue value) of the physical storage device 208 as the basis of the GI volume 210 or an actually measured value, for example.

GI group ID 40125 indicates an ID of a golden image group (GI group) including the golden image. In the present embodiment, one GI group includes one or more golden images that are the same. Thus, the golden images with the same GI group ID 40125 are the same GI. For example, when a golden image is prepared for each OS type, the golden images of the same OS type are provided with the same GI group ID 40125. For example, each GI group may include a plurality of the same GI volumes 210. Thus, the GI volume 210 that generates the SS volume 211 can be selected from a plurality of candidates, in accordance with loads of the GI volumes 210.

FIG. 12 illustrates the SS management table 4013.

The SS management table 4013 is a table that stores information on a snapshot managed by the management computer 400. The snapshot management table 4013 includes an entry for each snapshot.

SSID 40131 indicates an ID for uniquely identifying the snapshot.

Storage ID 40132 indicates an ID of the storage apparatus 200 including the SS volume 211 that stores the snapshot.

LDEV ID 40133 indicates an ID for uniquely identifying the SS volume 211 that stores the snapshot. Thus, the snapshot identified by the SSID 40131 is stored in the SS volume 211 identified by the Storage ID 40132 and the LDEV ID 40133.

GI ID 40134 indicates an ID of a golden image associated with the snapshot.

Pool ID 40135 indicates an ID of the differential pool 213 that stores differential data associated with the snapshot.

Differential amount 40136 indicates a total capacity of the differential data associated with the snapshot. For example, this information may be a value obtained by the storage apparatus 200 by referring to the differential management table 2032 and calculating the total capacity of the storage areas of the SS volumes 210 with anything other than "no data" as the differential storage area 20323, and the calculated value may be transferred to the management computer 400.

GI access frequency 40137 indicates the number of accesses per unit time from the host computer 100 to the GI volume 210 as the basis of the snapshot. For example, the information may be obtained by the storage apparatus 200 by counting the number of accesses to the GI volume 210, and may be transferred to the management computer 400.

Pool access frequency 40138 indicates the number of accesses per unit time from the host computer 100 to the differential pool 213 associated with the SS volume 211 storing the snapshot. This information may be obtained by the storage apparatus 200 by counting the number of accesses to the differential pool 213, and the information may be transferred to the management computer 400.

Allocated host 40139 indicates an ID of the host computer 100 allocated to the snapshot.

VM ID 401391 indicates an ID of a VM allocated to the snapshot.

Required response time 401391 is a response time required for the storage apparatus 200, when the VM, allocated to the snapshot, accesses the storage apparatus 200. For example, the required response time is designated by the user through the VM management computer 300 or the management computer 400.

FIG. 13 illustrates the pool management table 4014.

The pool management table 4014 is a table for managing information on the differential pool 213 in the storage apparatus 200 managed by the management computer 400. The pool management table 4014 includes an entry for each differential pool 213.

Pool ID 40141 indicates an ID for uniquely identifying the differential pool 213.

Storage ID 40142 indicates an ID of the storage apparatus 200 including the differential pool 213.

Pool capacity 40143 indicates a total capacity of the differential pool 213.

Pool remaining capacity 40144 indicates a capacity of an unused area of the differential pool 213. The unused area is an area storing no differential data.

For example, response time 40145 is a time period between a point where the host computer 100 issues a command to the storage apparatus 200 and a point where an access is made to the differential data of the differential pool 213 to receive a response to the command. For example, the response time 40145 may be a static response time (catalogue value) of the physical storage device 208 as the basis of the differential pool 213, or may be an actually measured value. When the differential pool 213 is generated based on the physical storage devices 208 of different types, an average response time of the physical storage devices 208 of the plurality of types may be used.

Operating rate 40146 indicates an operating rate of the differential pool 213. The operating rate is information indicating an access load to the differential pool 213. More specifically, for example, the operating rate may be a ratio of a current access frequency to the access frequency allowed by the differential pool 213. The operating rate is calculated by the storage apparatus 200 and transferred to the management computer 400.

Figure 14:
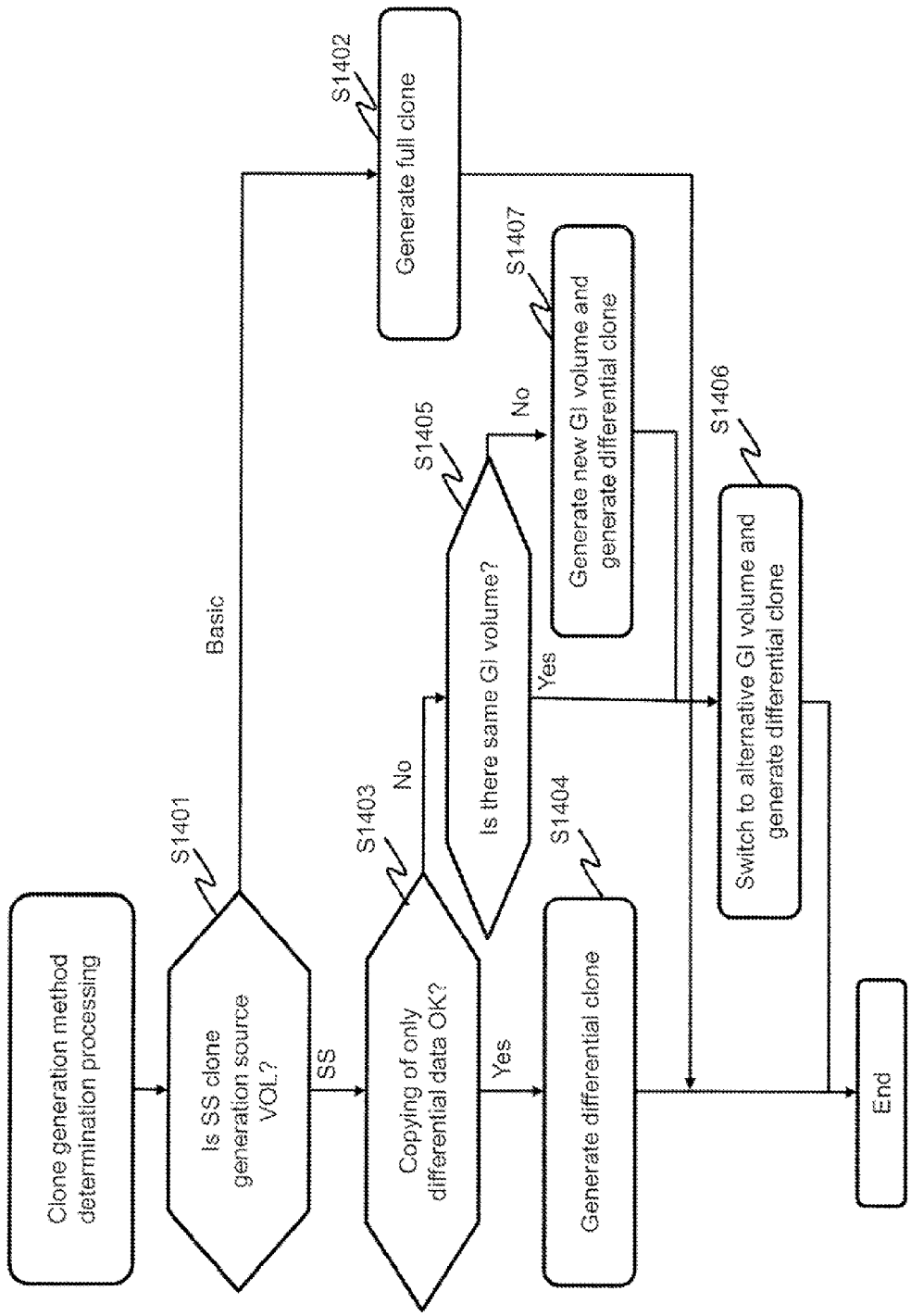
FIG. 14 is a flowchart illustrating clone generation method determination processing.

FIG. 14 is a flowchart illustrating the clone generation method determination processing.

The clone generation method determination processing is executed when the CPU 402 of the management computer 400 executes a clone generation method determination program 4015*a* stored in the storage resource 401. The clone generation method determination program 4015*a* is executed when the management computer 400 receives the clone generation instruction.

In the present embodiment, the clone generation instruction is transmitted to the management computer 400 in cases such as when the VM management computer 300 detects that the response time of the storage apparatus 200 is delayed over a predetermined level, when the VM management computer 300 determines that the data on the VM needs to be migrated to another logical volume in the storage apparatus 200, or the like. However, the case where the VM management computer 300 transmits the clone generation instruction to the management computer 400 is not limited to these.

The clone generation instruction includes an ID of a volume (copy source volume) as a clone generation source, and may also include a condition (required condition) required for determining a volume (copy destination volume) as a clone generation destination. For example, the required condition may be a disk type of the physical storage device 208 as the basis of the copy destination volume. Clone generation determination processing is described below.

The clone generation method determination program 4015 receives the clone generation instruction from the VM management computer 300, and determines the SS volume 211 or the Basic volume 212 as the copy source volume (S1401). More specifically, the program 4015 refers to the Volume Type 40113 of the logical volume management table 4011, and determines "SS" and "Basic" as the Volume Type of the copy source volume.

When the copy source volume is the Basic volume 212 (Basic in S1401), the program 4015 transmits the full clone generation instruction, for copying all the data stored in the Basic volume to a volume secured as the copy destination volume, to the storage apparatus 200 (S1402), and the processing is terminated.

On the other hand, when the copy source volume is the SS volume 211 (SS in S1401), the program 4015 determines whether the required response time can be achieved by copying the differential data stored in the copy source differential pool associated with the SS volume to another different differential pool (S1403). More specifically, for example, the program 4015 calculates a post-copy response time as a response time of the SS volume after the differential data is copied to the differential pool 213 selected by the required condition of the clone generation instruction. The program 4015 determines whether the post-copy response time is within the required response time 401391 for the copy source volume in the SS management table 4013.

For example, for the copy source volume, the post-copy response time is calculated by applying to the following formula, values of the response time 40124 in the GI management table 4012 corresponding to the GI ID 40134 in the SS management table 4013, the response time 40145 in the pool management table 4014 corresponding to the Pool ID 40135 in the SS management table 4013, the GI access frequency 40137 and the pool access frequency 40138 in the SS management table 4013.

Post-copy response time=GI access frequency/(GI access frequency+pool access frequency)×GI response time+pool access frequency/(GI access frequency+pool access frequency)×copy destination differential pool response time In the formula, the GI response time is a response time of the GI volume associated with the copy source volume, and the copy destination differential pool response time is a response time of the differential pool associated with the copy destination volume. Thus, the response time of the SS volume can be calculated in a case where the GI volume is unchanged and only the differential pool that stores the differential data is changed.

When the post-copy response time is within the required response time, the program 4015 determines that only the copying of the differential data is required, and the golden image of the GI volume 210 needs not to be changed to the copy destination GI volume 210 (Yes in S1403), and transmits the differential clone generation command, for copying the differential data to a different differential pool, as the clone generation command to the storage apparatus 200 (S1404), and the processing is terminated. When the clone generation by the storage apparatus 200 is completed, the SS volume 211 is newly generated, whereby the program 4015 adds an entry of the SS volume 211 to be the copy destination to the logical volume management table 4011 and the SS management table 4013.

On the other hand, when the post-copy response time is longer than the required response time, the program 4015 determines that not only the copying of the differential data is required, but also the golden image of the GI volume 210 needs to be changed to the copy destination GI volume 210 (No in S1403), and the processing proceeds to S1405.

When the required condition of the clone generation command includes a plurality of the differential pools, S1403 is executed for each of the differential pools as candidates of the copy destination of the differential data. The result of the determination in S1403 can be regarded as being Yes, when there is at least one differential pool with the post-copy response time within the required response time.

The program 4015 may refer to the performance information (e.g., operating rate and the like) indicating the access load to the physical storage device 208 as the basis of the GI volume 210 in addition to or instead of performing the determination in S1403. When a large access load is applied to the physical storage device 208, the program 4015 determines that not only the copying of the differential data is required, but also the golden image of the GI volume 210 needs to be changed to another GI volume 210 (No in S1403).

The program 4015 determines whether there is a GI volume that can be used instead of the GI volume 210 associated with a copy source SS volume 211a (S1405). More specifically, for example, the program 4015 acquires the GI ID 40134 of the GI volume 210 associated with the copy source SS volume 211a by referring to the SS management table 4013, and acquires the GI group ID 40125 including the GI volume 210 by referring to the GI management table 4012. The program 4015 checks whether the GI management table 4012 includes an entry with an ID that is the same as the acquired GI group ID. When there is the entry with the ID that is the same as the acquired GI group ID, it is determined that there is the GI volume 210 (alternative GI volume) that can be used instead of the GI volume. The program 4015 may make the determination while taking a load condition of the physical storage device as the basis of the alternative GI volume 210 into consideration.

When the result of the determination in 51405 is Yes, the program 4015 transmits to the storage apparatus 200, a GI volume switching command for switching the GI volume associated to the copy source SS volume 211a to the alternative GI volume and copying the differential data to a different differential pool, as the clone generation command (S1406), and the processing is terminated. When the clone generation by the storage apparatus 200 is completed, the SS volume 211 is newly generated, and thus the program 4015 further adds the entry of the copy destination SS volume 211 to the logical volume management table 4011 and to the SS management table 4013.

When a result of the determination in S1405 is No, it means that there is no alternative GT volume 210. Thus, the program 4015 transmits to the storage apparatus 200, a GI volume generation command for newly generating the alternative GI volume by copying the golden image of the GI volume 210 associated with the copy source SS volume 211a and performing switching to the alternative GI volume, and copying the differential data to a different differential pool, as the clone generation command (S1407), and the processing is terminated. The program 4015 adds a new entry to the GI management table 4012 and provides the new entry with an ID that is the same as the GI group ID provided to the copy source GI volume 210, upon newly generating the GI volume 210.

Through the processing described above, an appropriate method can be determined for copying the volume involving in the VM clone generation. In particular, an appropriate clone generation is determined through a comparison between the response time at the current time point and the response time after the clone generation, and an instruction based on the determination can be transmitted to the storage apparatus.

Figure 15:
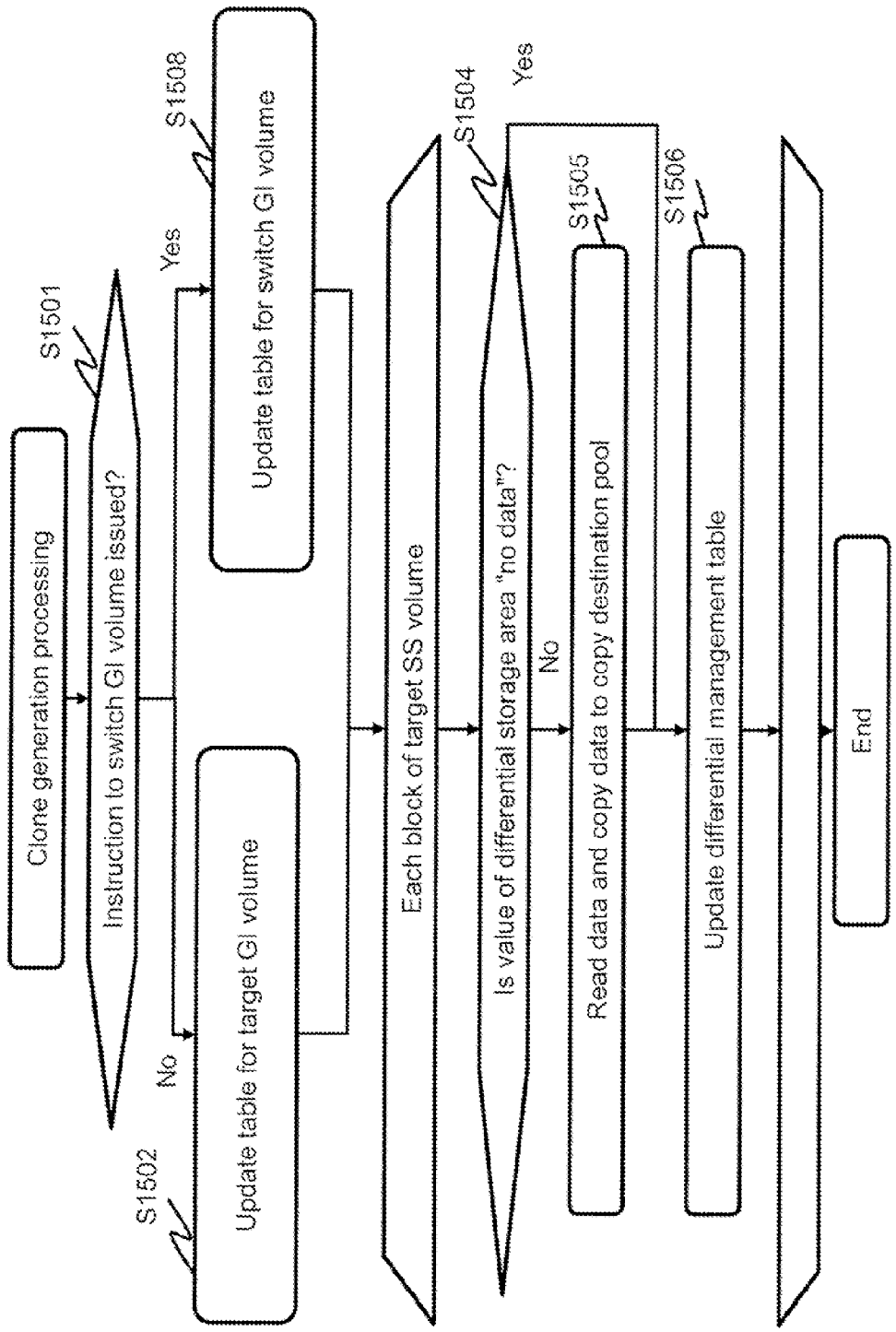
FIG. 15 is a flowchart illustrating clone generation processing.

FIG. 15 is a flowchart illustrating the clone generation processing.

The clone generation processing is performed when the CPU 204 of the storage apparatus 200 executes the clone generation processing program 2034 stored in the memory 203. The clone generation processing program 2034 is executed when a clone generation command, such as the differential clone generation command, the GI volume switching command, and the GI volume generation command from the management computer 400 in S1404, S1406, and S1407 in the clone generation method determination processing is received (FIG. 14).

The clone generation commands in S1404, S1406, and S1407 include an ID of a volume (copy source volume) as the clone generation source and an ID of the differential pool as the copy destination of the differential data. In addition, the GI volume switching command in S1406 may include an ID of the alternative GI volume 210. The processing is described below.

The clone generation processing program 2304 determines whether the received clone generation command is an instruction involving switching of the GI volume (S1501).

When the result of the determination in S1501 is No, that is, when the clone generation command in S1404 is received, the program 2034 updates the entry corresponding to the GI volume associated with the copy source SS volume 211a of the differential management table 2032 (S1502). More specifically, for example, the program 2034 identifies the entry corresponding to the ID of the GI volume in the differential management table 2032, and the newly generated SSID of the SS volume is added to the differential storage area 20323 of the entry and initialization is performed. In the example of FIG. 7, a case is illustrated where the clone generation for the SS volume "SS2", associated with the GI volume "VOL1", is instructed. In this case, to the differential storage area 20323 of the entry corresponding to the GI volume with the "VOL1" as the GI LDEV ID 20321, the SSID "SS2-1" is newly added, and initialized with the no data set to the field thereof. The program 2034 updates the logical volume management table 2031. More specifically, for example, the program 2034 adds an entry for managing the information on the new SS volume 211 to the logical volume management table 2031, and associates the entry with the GI volume. In the example in FIG. 6, a case is illustrated where an entry of the LDEV ID "VOL4", corresponding to the new SS volume, is added. In this case, "SS", "VOL1", "SS2-1", and the capacity "30G" of the new SS volume are respectively stored in the Volume Type 20312, the GI LDEV ID 20313, the SSID 20314, and the capacity 20316. Furthermore, an ID "Pool2" of the copy destination differential pool designated by the clone generation command is stored in the Pool ID 20315.

On the other hand, when the result of the determination in S1501 is Yes, that is, when the clone generation command in S1406 or S1407 is received, the program 2034 updates the entry of the alternative GI volume in the differential management table 2032 (S1508). More specifically, for example, for updating the differential management table 2032, the program 2034 identifies or adds the entry corresponding to the GI LDEV ID 20321 of the alternative GI volume, and the new SS volume is added to the differential storage area 20323 of the entry and initialization is performed. The program 2034 updates the logical volume management table 2031. More specifically, for example, the entry for managing the information on the new SS volume is added and associated with the alternative GI volume by the program 2034.

The program 2034 refers to the differential management table 2032, sets the new SS volume as a target SS volume, and executes from S1504 to 1506 on each differential storage area corresponding to the target SS volume. The differential storage area as a target of S1504 to 1506 is referred to as the target area in the following description.

The program 2034 determines whether the value of the target area is "no data" (S1504). More specifically, whether the differential data of the target SS volume is stored in the target area of the differential pool is determined.

When the result of the determination in S1504 is Yes, the program 2034 does not copy the differential data for the target area, and the processing proceeds to the next target area.

When the result of the determination in S1504 is No, the program 2034 reads out the differential data from the differential storage area identified by the differential pool and the block address of the target area, and writes the differential data to the copy destination differential pool designated by the clone generation command (S1505). The copy destination differential pool and the write destination block address are stored in the target area (S1506).

When the processing in S1504 to S1506 executed by the program 2034 is completed on all the target areas, the processing is terminated.

The information on the target SS volume 211 in the differential management table 2032 and the logical volume management table 2031 may be deleted as needed.

Through the processing described above, a copy of the volume to be the basis of the VM can be appropriately generated with the clone generation method determined by the management computer 400.

Figure 16:
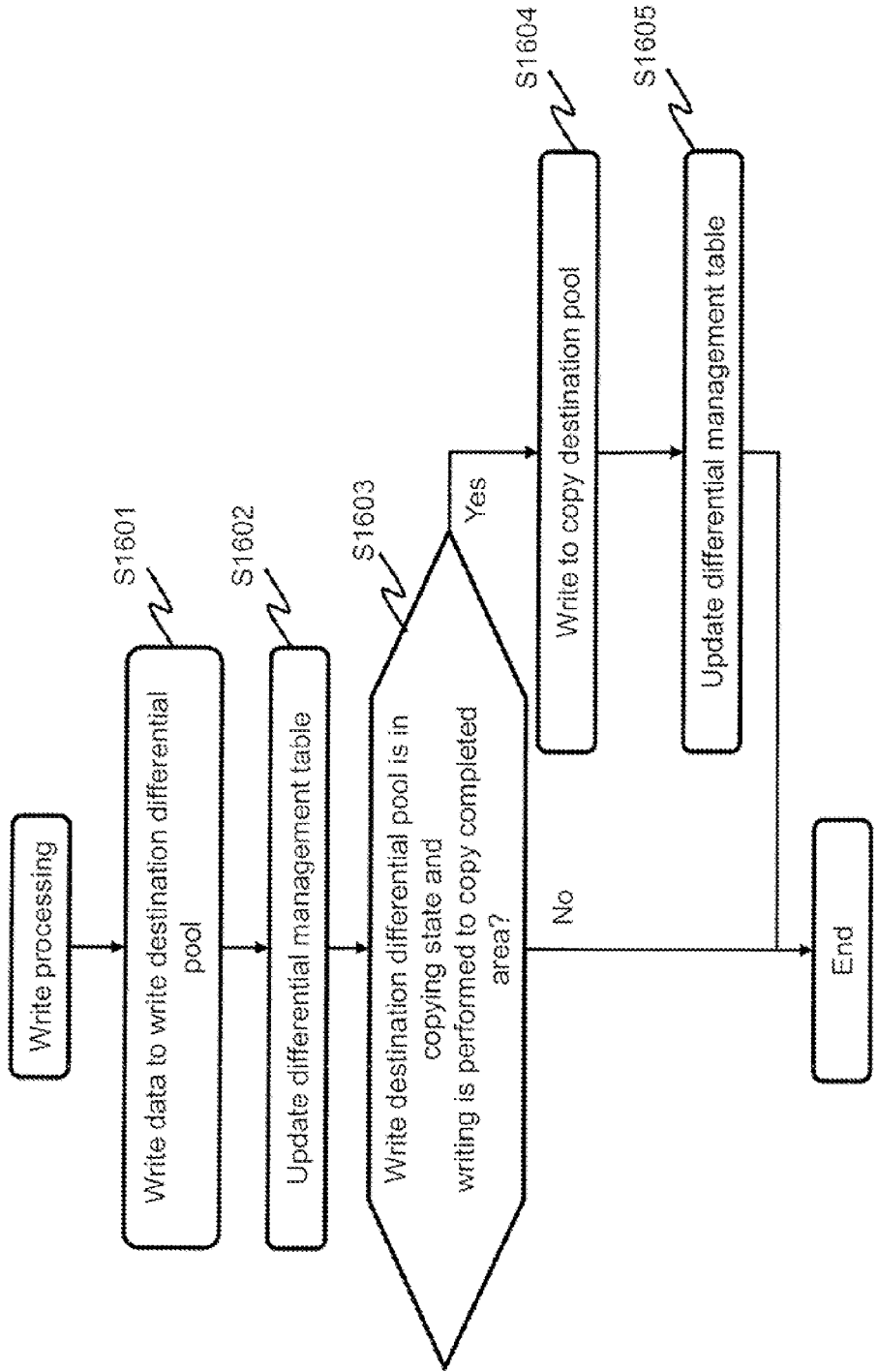
FIG. 16 is a flowchart illustrating a flow of the write processing.

FIG. 16 is a flowchart illustrating a flow of the write processing.

The processing is executed by the CPU 204 of the storage apparatus 200 by executing the write processing program 2035. The write processing program 2035 starts when the storage apparatus 200 receives a write request to the SS volume 211 from the host computer 100.

The program 2035 stores the differential data in the differential pool 213 associated with the write destination SS volume 211 designated by the write request (S1601).

The program 2035 stores the ID of the differential pool storing the differential data and the block address of the differential pool in the corresponding differential storage area 20323 in the differential management table 2032 (S1602).

The program 2035 determines whether the clone generation for the SS volume 211 as the write destination is in process, and whether the writing is performed to an area on which the copying has been completed (S1603). For example, in the clone generation processing, whether the target SS volume 211 is in the copying state or how far the copying processing has been completed may be managed in the logical volume management table 2031 (not illustrated). When the result of the determination in S1603 is No, the program 2035 terminates the processing.

When the result of the determination in S1603 is Yes, the program 2035 writes data to the differential pool 213 as the copy destination of the differential pool 213 associated with the SS volume as the write destination (S1604). The program 2035 stores, in the corresponding differential storing area in the differential management table 2032, the ID of the differential pool as the write destination of the differential data and the address in the differential pool (S1605).

In the first embodiment described above, when a volume as the basis of the VM is copied for generating a clone of the VM, whether only the differential data is copied or a full clone of the SS volume 211 is generated can be determined based on the configuration and performance information of the storage. Thus, the storage capacity can be prevented from being consumed over the expected level due to the full clone being generated from the SS volume 211 using the WSS against an intention of the user.

In the present embodiment, the various pieces of information and programs held by the management computer 400 may be held by the storage resource 301 of the VM management computer 300 or the memory 203 of the storage apparatus 200. In such a case, the present embodiment can be applied even in an environment not including the management computer 400.

Second Embodiment

Figure 17:
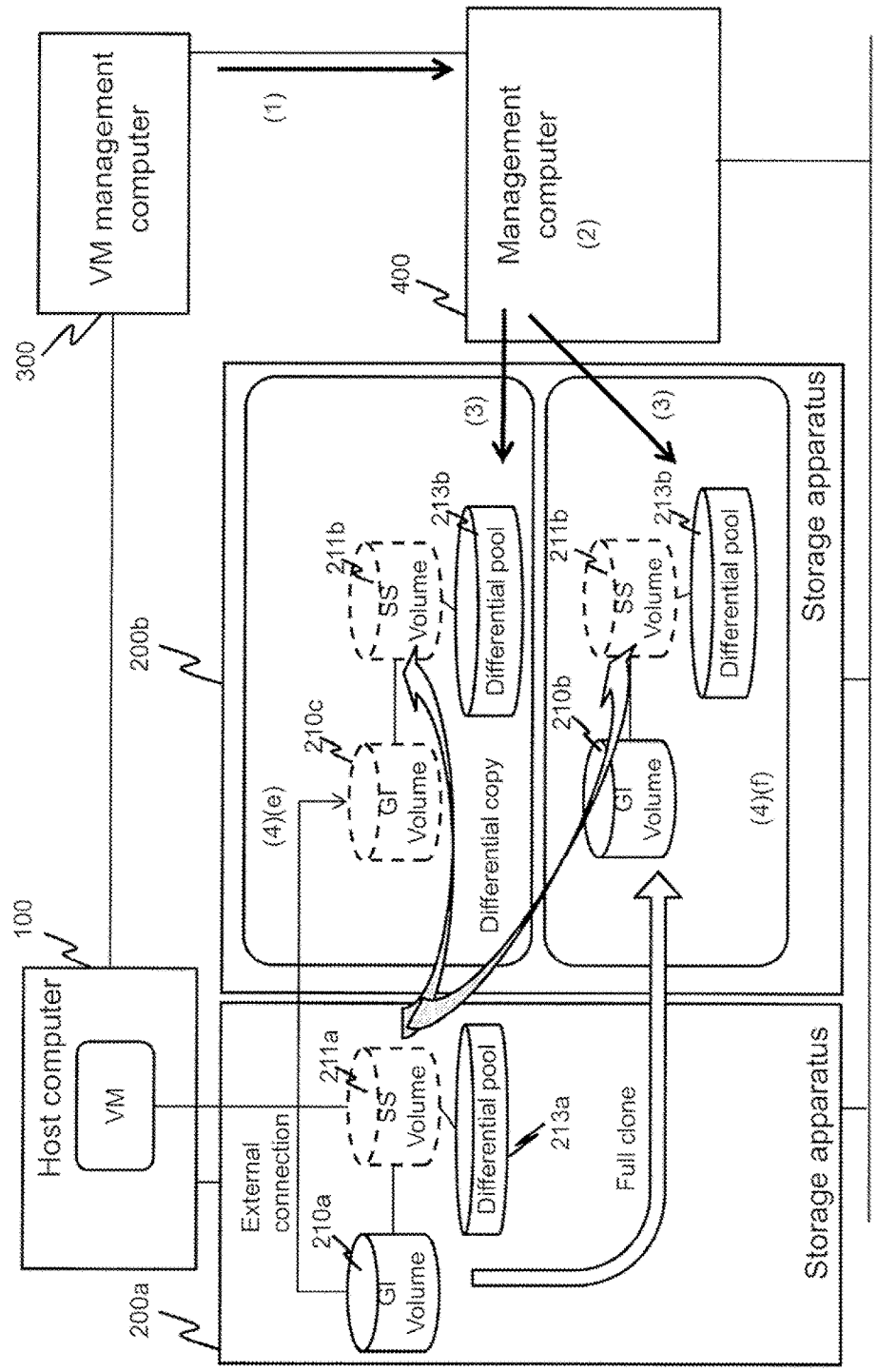
FIG. 17 is a diagram illustrating a clone generation method according to a second embodiment.

FIG. 17 is a diagram illustrating an overview of a clone generation method according to a second embodiment.

In a description of the present embodiment below, configurations that are the same as those in the first embodiment may be described while being denoted with the same reference numerals, or the description thereof may be omitted.

Clone generation method determination processing in the present embodiment includes a case where, determining of a method of generating a copy of a volume to be the basis of a VM by the management computer 400, includes determining a method of performing copying to a storage apparatus different from the storage apparatus including the volume as the copy source.

A computer system according to the present embodiment includes a storage system including a plurality of storage apparatuses 200a and 200b. More specifically, the computer system includes the external storage apparatus 200b coupled to the storage apparatus 200a. The computer system includes a virtual logical volume obtained by mapping the storage apparatus 200a to a logical volume of the external storage apparatus 200b with an external connection function.

With the external connection function, the logical volume generated from the physical storage device 208 of one storage apparatus can appear as if it is a logical volume of another storage apparatus. In the present embodiment, the GI volume 210 of the copy source storage apparatus 200a appears as if it is a logical volume of the copy destination storage apparatus 200b. When the copy destination storage apparatus 200b needs to read data stored in the GI volume 210, the copy destination storage apparatus 200b issues a read request to the copy source storage apparatus 200a to read the required data. For convenience sake, in the following description, the storage apparatus including the original GI volume 210 and the SS volume 211 may be referred to as a copy source storage apparatus 200a, and a storage apparatus as a clone generation destination may be referred to as a copy destination storage apparatus 200b, as appropriate.

Clone generation method determination processing executed by the management computer 400 is described below.

(1) This is the same as that in the first embodiment.

(2) The determination on a method of generating the SS volume 211b as the copy of the SS volume 211a includes the following methods.

(e) The storage system copies the differential data, in the differential pool 213a as the copy source, of the logical volume as the basis of the SS volume 211a to the copy destination differential pool 213b of the storage apparatus 200b as the copy destination. The storage system uses the external connection function to map the GI volume 210a of the copy source storage apparatus 200a to a virtual logical volume 210c of the copy destination storage apparatus 200b.

(f) The storage system copies differential data, in the differential pool 213a as the copy source, of the logical volume as the basis of the SS volume 211a to the copy destination differential pool 213b of the storage apparatus 200b as the copy destination. Then, the storage system generates the GI volume 210b, as the copy of the GI volume 210a of the copy source storage apparatus 200a, in the copy destination storage apparatus 200b.

The method (e) or (f) may be selected based on whether the access to the GI volume 211a of the copy source storage apparatus 200a is bottlenecked. For example, the management computer 400 generates the copy of the GI volume 210a in the copy destination storage apparatus 200b, upon determining that the access to the SS volume 211a as the copy source is delayed as a result of concentration of loads to the physical storage device 208 as the basis of the GI volume 211a as the copy source. This is because the bottleneck cannot be solved by enabling the access from the copy destination storage apparatus 200b to the GI volume 210 of the copy source storage apparatus 200a by using the external connection function.

The determination described above may be made by comparing an access performance (response time) in a case where an access is made to the GI volume 210a as the migration source by selecting (e) and thus using the external connection function, with an access performance (response time) in a case where an access is made to the migration destination GI volume 210b by selecting (f). For example, when (e) is selected, the access needs to be made through a network, and thus there might be an overhead of the access performance to the copy source storage apparatus 200a. Thus, the copy of the GI volume 210b may be generated in the copy destination storage apparatus 200b when a required response time cannot be achieved by selecting (f).

(3) This is the same as that in the first embodiment. The management computer 400 transmits the clone generation command to the storage apparatus 200 in accordance with the determination result. (4) This is also the same as that in the first embodiment, and the storage apparatus 200 generates a copy in accordance with the content of the instruction.

In the present embodiment, whether the configuration of the GI volume needs to be changed for generating a copy of the SS volume 211a in a different storage apparatus 200 can be determined, and thus meaningless clone generation that cannot solve the bottleneck can be prevented from being performed.

Figure 18:
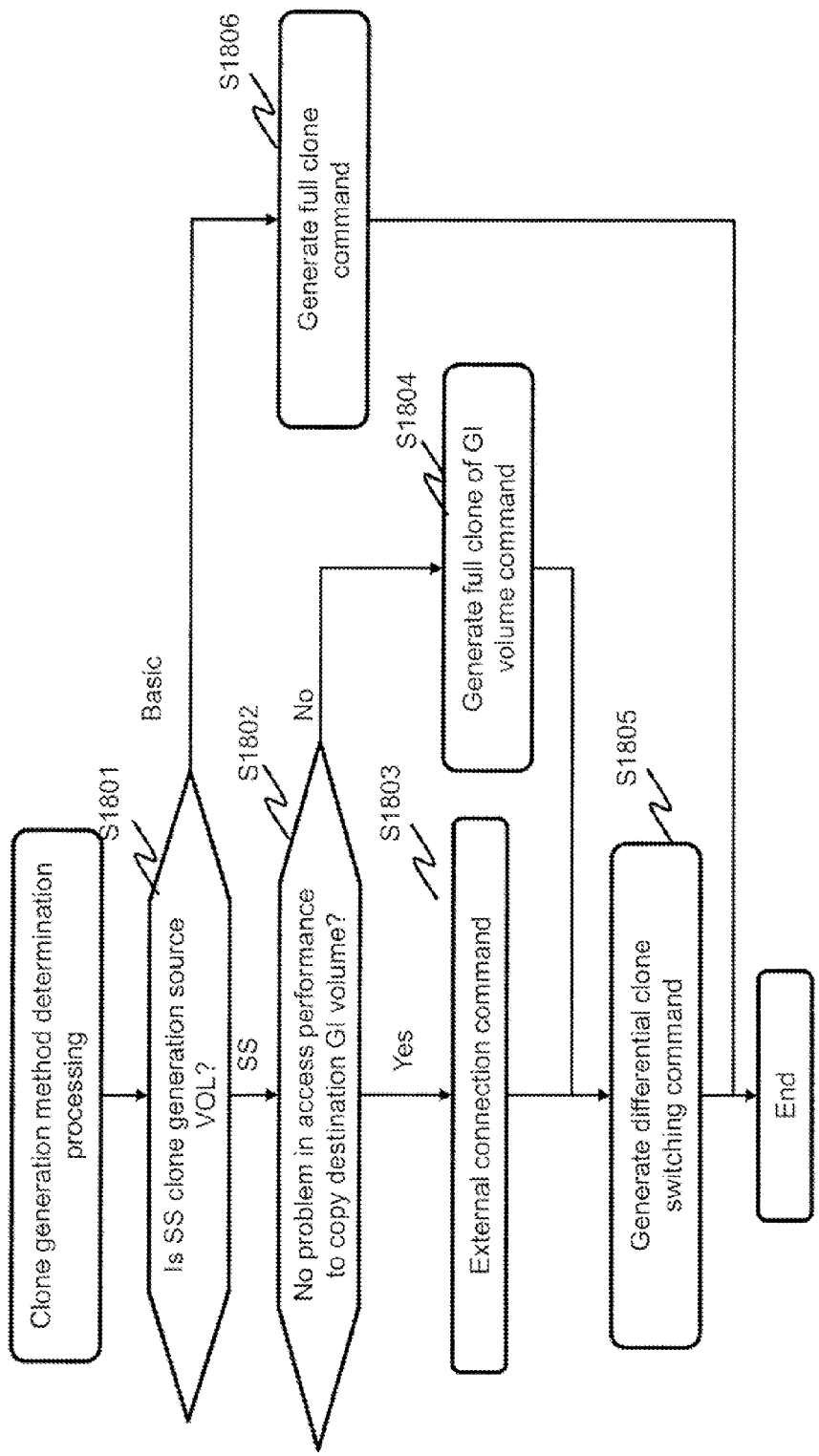
FIG. 18 is a flowchart of clone generation method determination processing according to the second embodiment.

FIG. 18 is a flowchart illustrating clone generation method determination processing according to the second embodiment.

The clone generation method determination processing is executed when the CPU 402 of the management computer 400 executes a clone generation method determination program 4015ba stored in the storage resource 401. The clone generation method determination program 4015ba is executed when the management computer 400 receives the clone generation instruction. The clone generation instruction designates the storage apparatus 200b as the copy destination storage apparatus. The VM management computer 300 monitors the host computer 100, and transmits the clone generation instruction to the management computer 400 upon detecting that the response time of the copy source storage apparatus 200a has exceeded a threshold set in advance.

The clone generation method determination program 4015b receives the clone generation instruction from the VM management computer 300, and checks whether the volume (copy source volume) to be the clone generation source is the SS volume 211 or the Basic volume 212 (S1801). More specifically, the program 4015 refers to the Volume Type 40113 in the logical volume management table 4011 to determine whether the Volume Type of the copy source volume is "SS" or "Basic".

When the copy source volume is the Basic volume 212 (Basic in S1801), the full clone generation instruction, for copying all data stored in the Basic volume to the copy destination volume, is transmitted to the storage apparatus 200a and/or 200b (S1802), and the processing is terminated.

On the other hand, when the copy source volume is the SS volume 211 (SS in S1801), the program 4015 determines whether the required response time can be achieved by only copying the differential data, stored in the differential pool associated with the SS volume, to the target differential pool of the copy destination storage apparatus 200b (S1802). More specifically, for example, the program 4015 calculates the post-copy response time as the response time as a result of copying the differential data to the copy destination storage apparatus 200b. The program 4015 determines whether the post-copy response time is within the required response time 401391 to the copy source volume in the SS management table 4013. The calculation of the post-copy response time is the same as that in the first embodiment. In this case, the GI response time is a response time of the GI volume of the copy source storage apparatus 200a. The GI response time is a response time required for the copy destination storage apparatus 200b that has received a command from the host computer 100 to access the copy source GI volume 211 of the copy source storage apparatus 200a and transmit a response to the command to the host computer 100.

When the result of the determination in S1802 is Yes, the program 4015 transmits an external connection command to the storage apparatus 200a and/or 200b (S1803), and the processing proceeds to S1805. More specifically, for example, the external connection command is an instruction for associating the copy source GI volume 210a with the logical volume (target GI volume) 210b of the copy destination storage apparatus 200b by using the external connection function.

When the result of the determination in S1802 is No, the program 4015 transmits a GI volume copy command to the copy destination storage apparatus 200b (S1804), and the processing proceeds to S1805. More specifically, for example, the GI volume copy command is an instruction for copying the copy source GI volume 210a of the copy source storage apparatus 200a to the copy destination storage apparatus 200b by a remote copy function and the like.

The program 4015 issues a GI volume switching command, for instructing the copying of the differential data in the copy source differential pool 213a to the copy destination differential pool 213b, to the storage apparatus 200a and/or 200b (S1805), and the processing is terminated.

Here, the storage apparatuses 200a and/or the 200b each receive the clone generation command transmitted in S1805, and refer to the differential management table 2032 stored in the memory 203 thereof, to execute the clone generation processing. In the present embodiment, switching of the GI volume 211 is definitely performed (Yes in S1501 in FIG. 15) regardless of whether the instruction is issued in (e) or (f), and S1508 is executed. The copy destination GI volume 210b that may or may not be externally connected to the copy source GI volume 210a is managed by the copy destination storage apparatus 200b. Thus, in S1508, information on new SS volume 211b is registered in the differential management table 2032 of the copy destination storage apparatus 200b. Then, the differential data is read from the copy source differential pool 213a based on the differential management table 2032a of the copy source storage apparatus 200a, and is transmitted to the copy destination storage apparatus 200b, whereby the differential management table 2032b of the copy destination storage apparatus 200b is updated.

Through the processing described above, an appropriate method can be determined for copying a volume between the storage apparatuses 200 for generating a clone of the VM. More specifically, an appropriate clone generation is determined by comparing the response at the current time point with the response time after the clone generation, and an instruction based on the determination can be transmitted to the storage apparatus.

The clone generation method determination processing according to the present embodiment may include the clone generation method determination processing according to the first embodiment.

Figure 19:
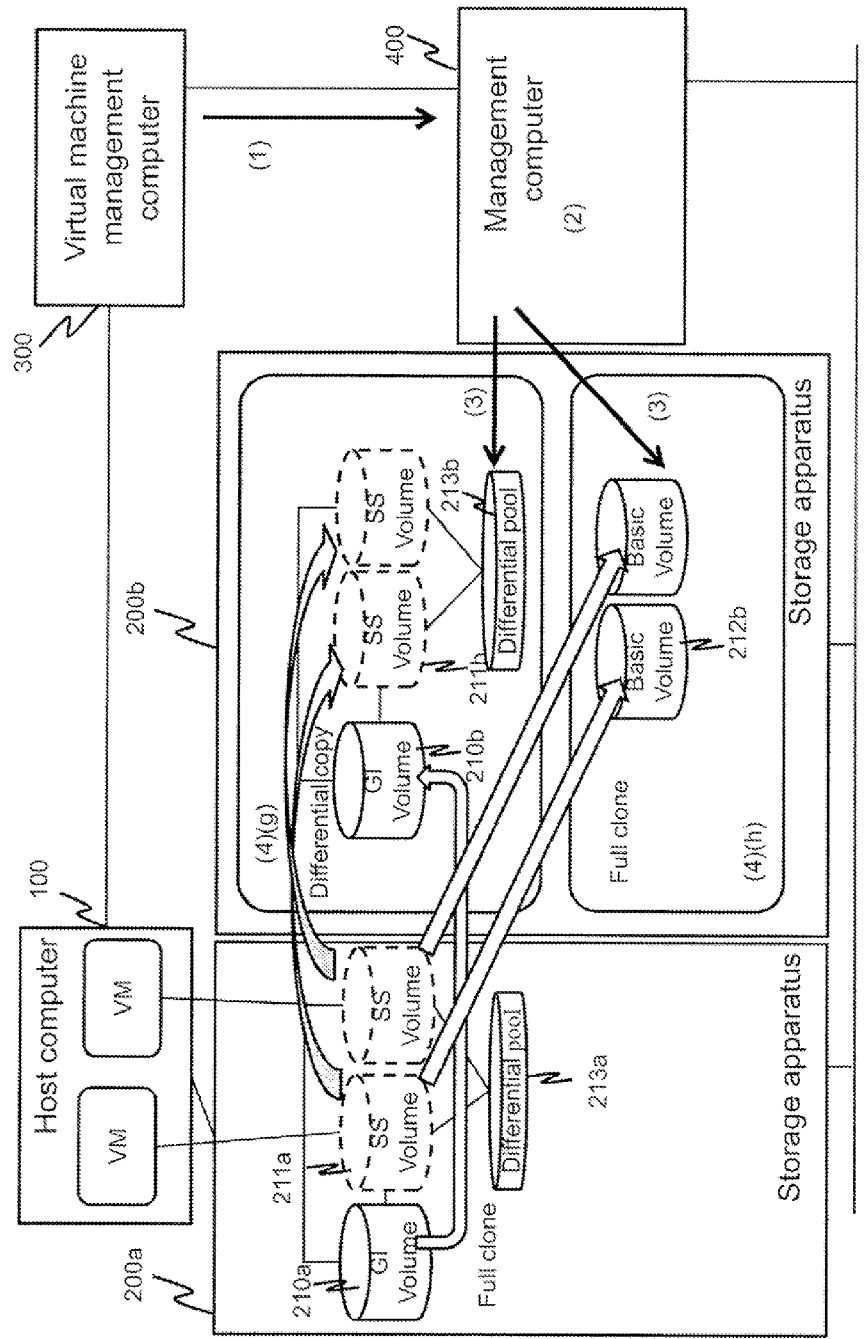
FIG. 19 illustrates a modification of a computer system according to the second embodiment.

FIG. 19 illustrates a modification of the computer system according to the second embodiment.

In this example, copies of all the SS volumes 211a of the storage apparatus 200a are generated in the storage apparatus 200b. For example, this is performed in a case where the operation of the storage apparatus 200a is (temporarily) for the maintenance for the storage apparatus 200a, or in other like cases.

In this example, (2) in the clone generation method determination processing executed by the management computer 400 includes the following variations.

(2) The following methods are included for determining a method for generating a copy of the SS volume 211.

(g) The storage system copies the logical volume of the copy source storage apparatus 200a to the copy destination storage apparatus 200b, with the configuration of the SS volume maintained. More specifically, for example, the data of the GI volume 210a of the copy source storage apparatus 200a and the differential data in the differential pool 213a are all copied to the copy destination storage apparatus 200b.

(h) The storage system generates the Basic volume 212b, as a full clone of the SS volume 211a of the copy source storage apparatus 200a, in the storage apparatus 200b.

In the determination described above, the total capacity of data required to be copied from the storage apparatus 200a to the storage apparatus 200b, and method with a smaller total capacity may be selected. For example, the copy source storage apparatus 200a includes two SS volumes 211a. The two SS volumes 211a are based on a common GI with a capacity of 30 GB stored in the GI volume 210a and differential data each having a capacity of 25 GB stored in the differential pool 213a. Here, the total capacity of data copied from the storage apparatus 200a as the copy source to the copy destination storage apparatus 200b is 80 GB as a sum of GI of 30 GB of the GI volume 210a and total of 50 GB of two pieces of the differential data. On the other hand, when the Basic volume as the full clone of the two SS volumes 211a is generated in the copy destination storage apparatus 200b and, for example, the GI of the GI volume is rewritten with corresponding update data, the capacity is the same between the data stored in the Basic volume and the GI stored in the GI volume. More specifically, the total capacity of data copied from the storage apparatus 200a as the copy source to the copy destination storage apparatus 200b is 60 GB that is the same as the total capacity of pieces of data of the two SS volumes. Here, the total capacity of data copied to the copy destination storage apparatus 200b is smaller in a case where a full clone of each of the two SS volume 211 is generated than in a case where the GI of the GI volume 210 and the differential data are copied. Thus, it can be determined that the case of generating the full clones of the two SS volumes are generated is more preferable.

In this example, a clone generation method may be determined based on the total capacity of data required to be copied, and a method with a smaller total capacity of the data to be copied can be selected.

Figure 20:
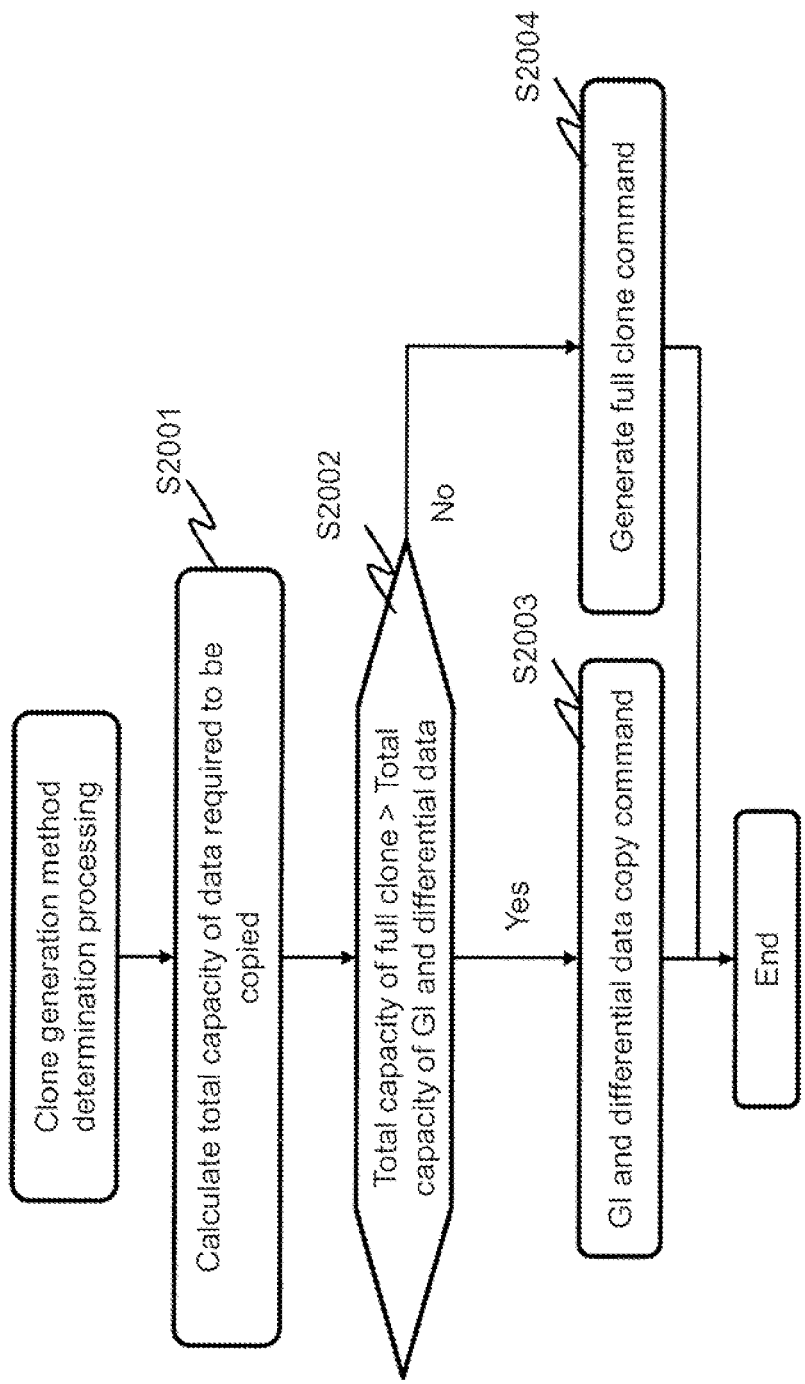
FIG. 20 is a flowchart illustrating clone generation method determination processing according to a modification of the second embodiment.

FIG. 20 is a flowchart of the clone generation method determination processing according to the modification of the second embodiment.

The clone generation method determination processing is executed when the CPU 402 of the management computer 400 executes a clone generation method determination program 4015bb stored in the storage resource 401. The clone generation method determination program 4015bb is executed when the management computer 400 receives the clone generation instruction. For example, the clone generation instruction is transmitted to the management computer 400 based on a migration instruction, for the SS volume 211a of the copy source storage apparatus 200a, issued to the VM management computer 300 by a user that has planned the maintenance of the storage apparatus.

The program 4015bb calculates the total capacity of data required to be copied to the storage apparatus 200b for the two methods (g) and (h) (S2001). More specifically, the program 4015bb refers to the capacity 40114 in the logical volume management table 4011 to acquire the capacity of the GI volume 210 associated with the migration source SS volume 211a, and further refers to the differential amount 40136 in the SS management table 4013 for a differential amount of the SS volume 211.

From the result of the calculation in S2001, the program 4015 compares (g) the total capacity of data to be copied while maintaining the snapshot configuration with (h) the total capacity of data to be copied when the full clone of the SS volume 211 is generated, and determines whether the total capacity of data to be copied in (h) is larger than the total capacity of data to be copied in (g) (S2002).

When the result of the determination in S2002 is Yes, the storage apparatus 200 is instructed to copy the GI volume 210a and each differential data (S2003), and the processing is terminated.

When the result of the determination in S2002 is No, the storage apparatus 200 is instructed to generate the Basic volume as the full clone of the SS volume 211b (S2004), and the processing is terminated.

In the processing described above, whether the snapshot configuration should be maintained or whether the copy of the GI volume should be generated can be determined based on the total capacity of data that needs to be copied, and a method involving a smaller total capacity of data to be copied can be selected. Thus, the storage capacity of the storage apparatus can be prevented from being consumed over an expected level, and unnecessary clone generation that cannot solve the bottleneck can be prevented from being performed.

Third Embodiment

Figure 21:
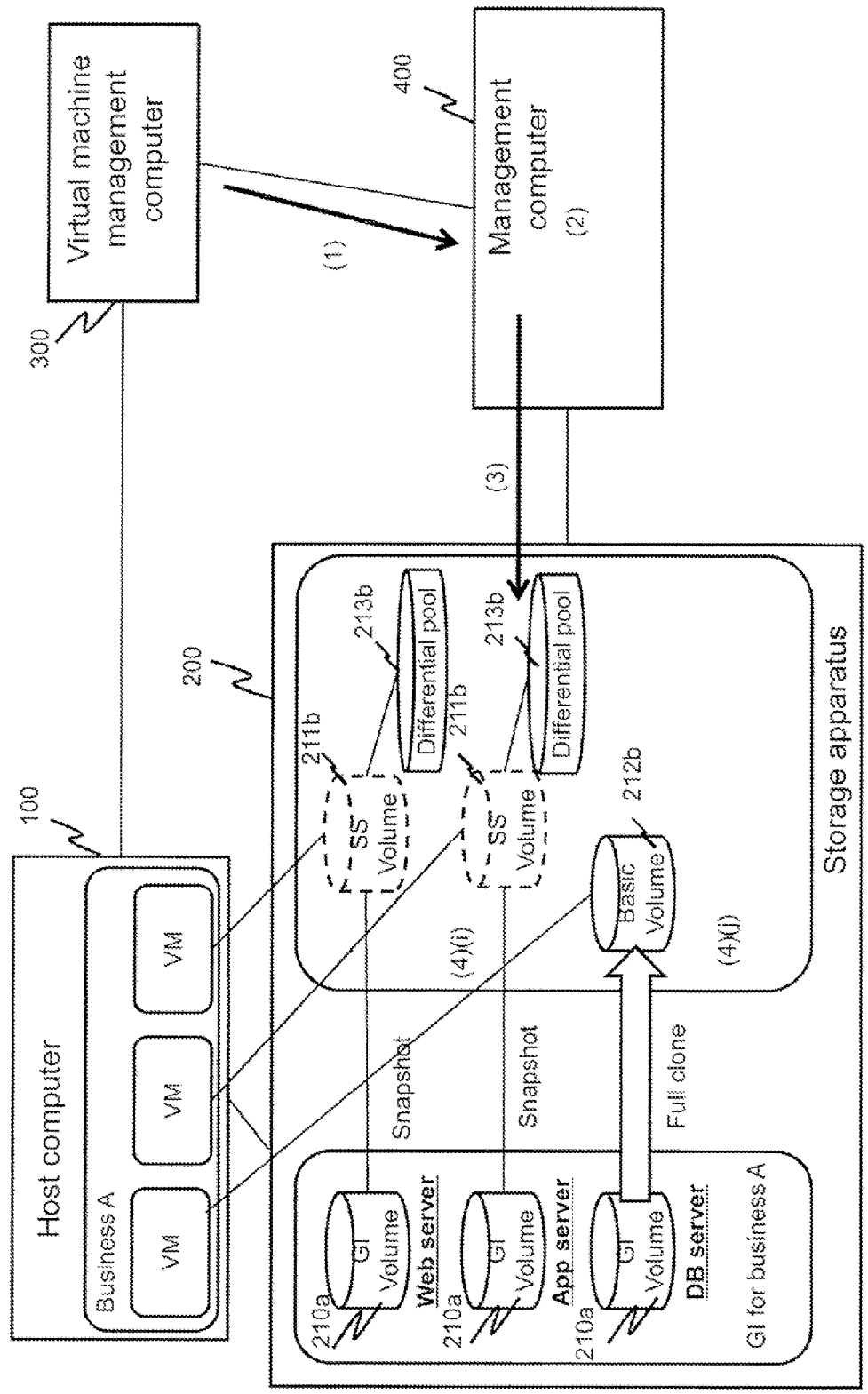
FIG. 21 is a diagram illustrating an overview of a clone generation method according to a third embodiment.

FIG. 21 is a diagram illustrating an overview of a clone generation method according to a third embodiment.

The clone generation method according to the present embodiment is performed when a VM is newly generated from a golden image, and whether the SS volume 211, associated with the GI volume 210 and the differential pool 213, is generated or the Basic volume 212 as the full clone of the GI volume 210 is generated is determined based on a condition defined in advance.

The management computer 400 receives the clone generation instruction from the VM management computer 300. In an example illustrated in FIG. 21, a clone generation instruction based on the golden image of each VM is received to newly establish a business A including VMs of a Webserver, an Application server (Appserver), and a Database server (DB server). Clone generation method determination processing executed by the management computer 400 is described below.

(1) This is the same as that in the first embodiment and the second embodiment.

In this example, (2) in the clone generation method determination processing executed by the management computer 400 includes the following methods.

(i) The storage apparatus 200 generates the SS volume 211 with the WSS.

(j) The storage apparatus 200 generates the Basic volume 212 as the copy of the GI volume storing the golden image.

In the present embodiment, the VM based on the golden image can be generated under the condition defined in advance. In the first and the second embodiments, the storage capacity required for storing data can be prevented from unintentionally increasing due to the clone generation. In the present embodiment, a storage capacity can be easily prevented from being unintentionally consumed due to an operating condition of the storage and a requirement of a client, when a VM is newly generated.

FIG. 22 illustrates a template management table 4016.

The template management table 4016 is stored in the storage resource 401 of the management computer 400. The template management table 4016 is a table for managing a clone generation method based on a golden image. In the present embodiment, the clone generation method determination processing corresponds to the clone generation method defined in the template management table 4016.

The template management table 4016 includes an entry for each virtual machine.

The template ID 40161 indicates an ID for uniquely identifying a template of the virtual machine. One template includes one or more golden images. A VM is generated from the one or more golden images as the template.

The template name 40162 indicates the name of the template. More specifically, for example, the template name may be defined by the user, and may be the name of the business involving the VM generated from the template.

GI ID 40163 indicates an ID for uniquely identifying a golden image corresponding to the virtual machine.

Virtual machine 40164 stores the name of the virtual machine, defined by the user.

Clone generation method 40165 indicates a clone generation method for the golden image. In a case of "Snapshot", a copy is generated from the GI volume as the basis of the SS volume and the differential pool, with the WSS. In a case of "FullClone", the copy of the golden image stored in the GI volume is generated in the Basic volume.

In an example illustrated in FIG. 22, the template with "1" as the template ID includes golden images of a virtual Webserver, a virtual Appserver, and a virtual DB server. When the virtual Webserver and the virtual Appserver are generated, a clone is generated from the GI volume based on the SS volume and the differential pool, with the WSS. On the other hand, when the virtual DB server is generated, the full clone of the golden image stored in the GI volume is generated as the Basic volume. In the present embodiment, the user may set the policy for the clone generation method.

Figure 23:
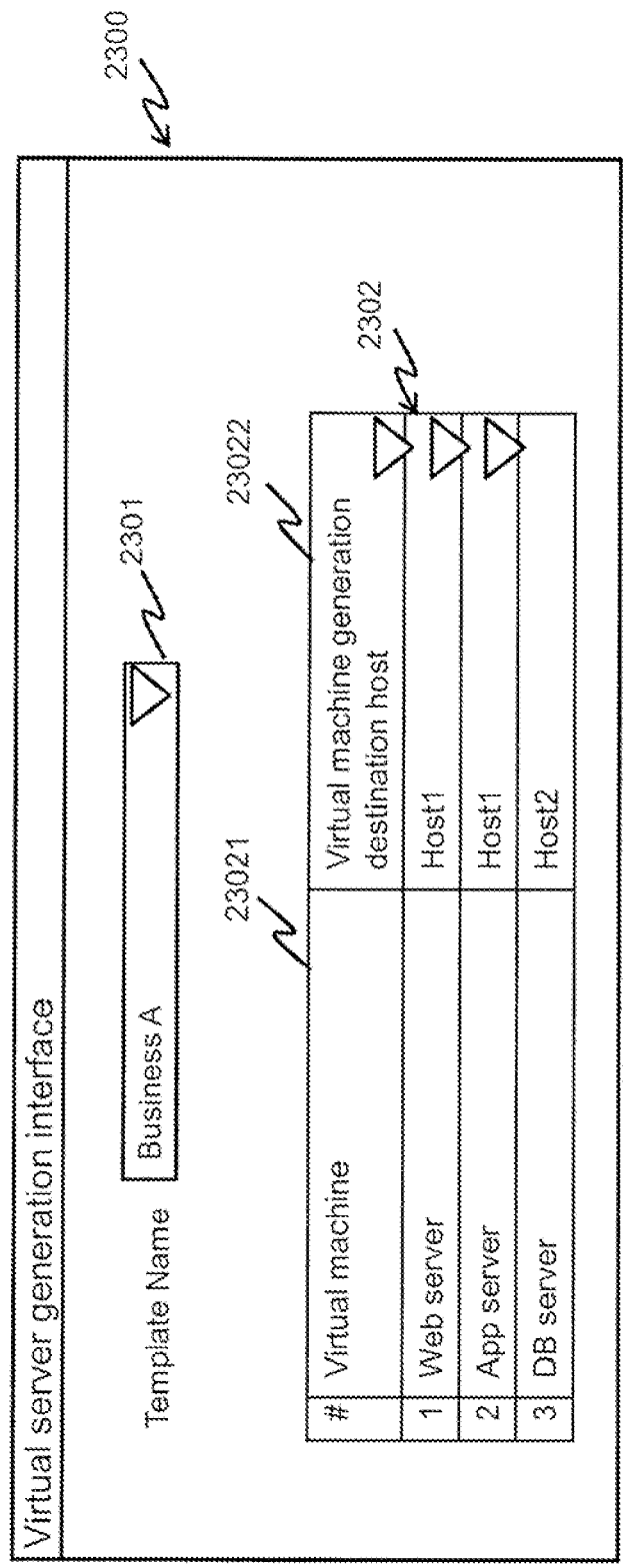
FIG. 23 illustrates an example of a virtual machine generation interface 2300.

FIG. 23 illustrates an example of a virtual machine generation interface 2300.

The virtual machine generation interface 2300 is a user interface provided by the VM management computer 300. For example, the user sets the policy of the clone generation method through the virtual machine generation interface 2300.

The virtual machine generation interface 2300 includes a template name designation field 2301 and a virtual machine list 2302.

The template name designation field 2301 is a field in which the template name is designated with a pull down menu. When the template name is designated in the template name designation field 2301, the virtual machine list 2302 corresponding to the template is displayed.

The virtual machine list 2302 includes a virtual machine generation destination host designation field 23022 for each virtual machine 23021. The virtual machine generation destination host designation field 23022 is a field in which the host computer where the VM is generated is designated with a pulldown menu.

In the present embodiment, the VM management computer 300 provides the virtual machine generation interface 2300, and the management computer 400 includes the template management table 4016. When the user sets the policy from the virtual machine generation interface 2300 of the VM management computer 300 and the virtual machine generation instruction is received from the VM management computer 300, the management computer 400 determines the clone generation method for each virtual machine in accordance with the clone generation method described in the template management table 4016. Alternatively, the VM management computer 300 may include the template management table 4016. In this case, the VM management computer 300 determines the clone generation method, and transmits the clone generation instruction directly to the storage apparatus 200 without involving the management computer 400.

The condition may be dynamically changed. For example, a differential data amount of existing VMs generated from the same template may be acquired, and (i) may be performed when the differential data thus acquired is larger than a threshold set in advance. Thus, the clone generation method may be determined in accordance with the operating condition of the VM and a capacity efficiency.

In the processing involving (i), the SS volume 211 cannot be accessed when the GI volume 210 fails. In the processing involving (j), the Basic volume is completely independent from the GI volume 210 and thus can be accessed, even when the GI volume 210 fails. Furthermore, in the processing involving (i), the access performance of the SS volume 211 depends on the other SS volume 211 sharing the same GI volume 210, and thus the expected response time might not to be achieved. However, this is not a case in the processing involving (j). The user may define the clone generation method for each virtual machine in view of the above, and while taking the characteristics of each VM into consideration.

Alternatively, the clone generation method may not be defined with the template management table 4016. Levels of fault tolerance and performance required for each VM may be defined in advance, and the clone generation method may be defined for each level with a table different from the template management table 4016.

The operating condition of the VM may be monitored, and the full clone may be generated for a VM with the capacity of the differential data exceeding a certain threshold.

Fourth Embodiment

Figure 24:
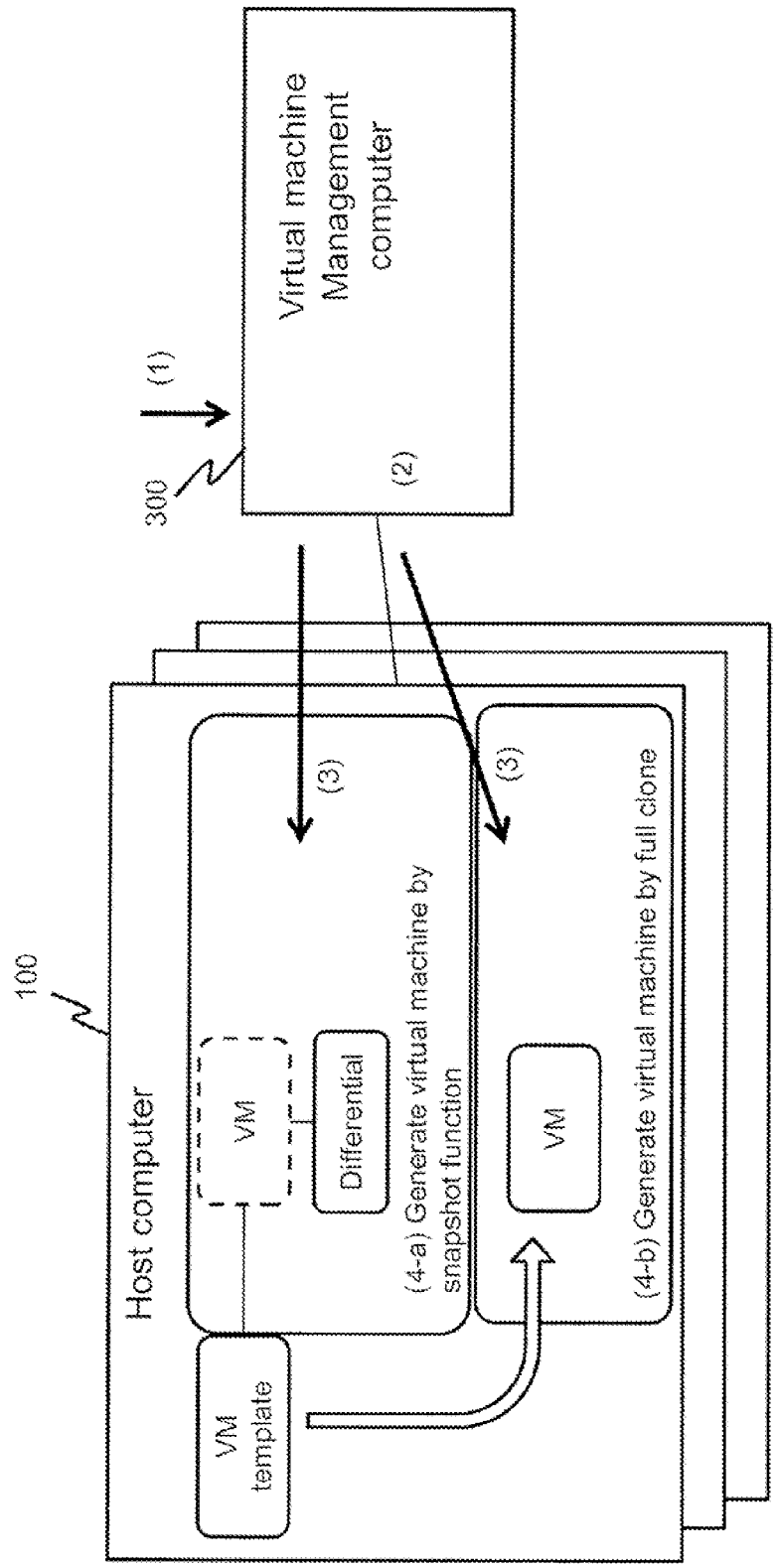
FIG. 24 is a diagram illustrating an overview of a clone generation method according to a fourth embodiment.

FIG. 24 is a diagram illustrating an overview of a clone generation method according to a fourth embodiment.

A computer system according to the present embodiment does not include the storage apparatus 200 and the host computer 100 has the WSS function. In the present embodiment, the storage resource 101 of the host computer 100 stores the golden image and the differential data. The storage resource 101 further stores the tables and the programs (refer to FIG. 5), stored in the memory 203 of the storage apparatus 200 in the other embodiments, such as the snapshot control program 2037 and the clone generation processing program 2034. In this case, each processing is executed when the CPU of the host computer 100 refers to information in the storage resource 101 and executes a program in the storage resource 101. The procedure itself is the same as that in the other embodiments.

In the present embodiment, the computer system does not include the management computer 400, and the VM management computer 300 has the functions of the management computer 400. In the present embodiment, the storage resource 301 of the VM management computer 300 stores the table and the programs (refer to FIG. 9), stored in the storage resource 401 of the management computer 400 in the other embodiments. In this case, each processing is executed when the CPU 302 of the VM management computer 300 refers to information in the storage resource 301 and executes a program in the storage resource 301. The procedure itself is the same as that in the other embodiments.

In the configuration described above, even when the computer system does not include the storage apparatus 200 and the management computer 400, the VM as the snapshot or the full clone can be generated in accordance with the configuration information, the performance information, and the condition defined in advance. The configuration of the present embodiment can be also applied to a case where the clone is generated from the copy source host computer to the copy destination host computer, to migrate the VM.

The computer system according to the present embodiment may include the storage apparatus 200. In this case, the storage apparatus 200 may store data, and the host computer 100 may include the WSS and perform clone generation on the storage apparatus.

A first image corresponds to the golden image and the like, and a second image corresponds to the snapshot and the like. A first volume corresponds to the GI volume 210 and the like. A second volume as the virtual logical volume corresponds to the SS volume 211b and the like. A second volume as the logical volume corresponds to the Basic volume 212 and the like. A third volume corresponds to the SS volume 211a and the like. A fourth volume corresponds to the virtual logical volume 210c in the second embodiment and the like. A fifth volume corresponds to the GI volume 210b in the second embodiment and the like. A plurality of copy source volumes correspond to the plurality of SS volumes 211a in the modification of the second embodiment. A plurality of copy destination volumes correspond to the plurality of SS volumes 211b in the modification of the second embodiment. A sixth volume corresponds to the GI volume 210b in the modification of the second embodiment. A first area corresponds to the differential storage area in the differential pool 213a and the like. A second area corresponds to the differential storage area in the differential pool 213b and the like.

First to fourth processing corresponds to command based generation processing from (a) to (d) in the first embodiment and the like. Fifth and sixth processing corresponds to command based generation processing in (e) and (f) in the second embodiment and the like. Seventh and eighth processing corresponds to command based generation processing in (g) and (h) in the modification of the second embodiment.

REFERENCE SIGNS LIST

100 Host computer
200 Storage apparatus
300 Virtual server management computer
400 Management computer

The invention claimed is:

1. A management computer comprising:
a memory; and
a processor coupled to a storage system that provides a first volume as a logical volume that stores a first image of an object and to the memory, wherein
the processor:
recognizes a state of the storage system;
based on the state, selects one generation processing from a plurality of generation processing including: first generation processing, executed by the storage system, of generating a second volume as a virtual logical volume that stores a second image of the object and associating the second volume with the first image and differential data from the first image to provide the second volume; and second generation processing, executed by the storage system, of generating the second volume as a logical volume and copying the first image to the second volume to provide the second volume; and
transmits an instruction to execute the selected generation processing to the storage system.

2. The management computer according to claim 1, wherein the object is a virtual computer.

3. The management computer according to claim 2, wherein when the storage system generates a third volume as a virtual logical volume in which the first image in the first volume is associated with the differential data stored in a first area of the storage system, and an instruction to generate the second volume as a copy of the third volume is input to the management computer, the storage system generates the second volume as the virtual logical volume, associates the first image in the first volume with the second volume, copies the differential data from the first area to a second area in the storage system, and associates differential data in the second area with the second volume in the first generation processing, and the storage system generates the second volume as the logical volume, and copies the first image in the first volume and the differential data in the first area to the second volume in the second generation processing.

4. The management computer according to claim 3, wherein the plurality of generation processing further include:
third generation processing, executed by the storage system, of generating the second volume as the virtual logical volume, associating, with the second volume, a switching destination image that is the same as the first image and is stored in a switching destination volume different from the first volume, copying the differential data from the first area to the second area, and associating the differential data in the second area with the second volume; and
fourth processing, executed by the storage system, of generating the second volume as the virtual logical volume, generating a new logical volume as a copy of the first volume, associating the new logical volume with the second volume, copying the differential data from the first area to the second area, and associating differential data in the second area with the second volume.

5. The management computer according to claim 4, wherein
the state includes a response time for an access to the second volume, the memory stores a required response time set in advance for the response time, and
the processor selects one generation processing from the plurality of generation processing based on the state, when the response time exceeds the required response time.

6. The management computer according to claim 5, wherein
the memory further stores: image access information including a response time and an access frequency for an access to the first volume; and differential access information including a response time and an access frequency for an access to the first area, and the processor:
calculates, based on the image access information and the differential access information, a post-copy response time which is a response time for an access to the second volume in the case of generating the second volume as a copy of the third volume; and
selects the first generation processing when the post-copy response time is within the required response time.

7. The management computer according to claim 6, wherein
the processor:
selects the third generation processing when the post-copy response time exceeds the required response time and the switching destination volume that stores the switching destination image is exist; and
selects the fourth generation processing when the post-copy response time exceeds the required response time and the switching destination volume that stores the switching destination image is not exist.

8. The management computer according to claim 7, wherein the processor executes processing of selecting one generation processing from the plurality of generation processing when a response performance of the storage system fails to satisfy a predetermined required condition.

9. A computer system comprising:
a storage system that provides a first volume as a logical volume that stores a first image of an object to a host computer; and
a management computer coupled to the host computer and the storage system, wherein
the management computer selects, based on a state of the storage system, one generation processing from a plurality of generation processing including first generation processing and second generation processing executed by the storage system, and transmits an instruction to execute the selected generation processing to the storage system, in response to an instruction to execute the first generation processing, the storage system generates a second volume as a virtual logical volume that stores a second image of the object, and associates the second volume with the first image and differential data from the first image to provide the second volume to the host computer, and in response to an instruction to execute the second generation processing, the storage system generates the second volume as a logical volume and copies the first image to the second volume to provide the second volume to the host computer.

10. The computer system according to claim 9, wherein the object is a virtual computer operating on the host computer.

11. The computer system according to claim 10, wherein
the management computer selects, based on the state of the storage system, one generation processing from first generation processing and second generation processing as processing of generating, as the second volume, a copy volume of a third volume as a virtual logical volume in which the first image in the first volume is associated with the differential data stored in a first area, and transmits an instruction to execute the selected generation processing to the storage system, when the storage system generates the third volume as the virtual logical volume in which the first image in the first volume is associated with the differential data stored in the first area in the storage system, and an instruction to generate the second volume as a copy of the third volume is input to the management computer, in response to an instruction to execute the first generation processing, the storage system generates the second volume as the virtual logical volume, associates the first image in the first volume with the second volume, copies the differential data from the first area to a second area, and associates differential data in the second area with the second volume, to provide the second volume to the host computer, and in response to an instruction to execute the second generation processing, the storage system generates the second volume as the logical volume and copies the first image in the first volume and the differential data in the first area to the second volume, to provide the second volume to the host computer.

12. The computer system according to claim 11, wherein
the storage system includes a plurality of storage apparatuses, a copy source storage apparatus, among the plurality of storage apparatuses, includes the first volume, the first area, and the third volume, the management computer selects, based on the state of the storage system, one generation processing from a plurality of generation processing including fifth generation processing and sixth generation processing as processing of generating the second volume, as a copy of the third volume in the copy source storage apparatus and as the virtual logical volume, in a copy destination storage apparatus among the plurality of storage apparatuses, and transmits an instruction to execute the selected generation processing to the storage apparatus, in response to an instruction to execute the fifth generation processing, the storage system generates, in the copy destination storage apparatus, a fourth volume as a virtual logical volume associated with the first volume, and the second volume, associates a first image in the fourth volume with the second volume, copies the differential data in the first area in the copy source storage apparatus to the second area in the copy destination storage apparatus, and associates the differential data in the second area with the second volume, to provide the second volume to the host computer, and in response to an instruction to execute the sixth generation processing, the storage system generates, in the copy destination storage apparatus, a fifth volume as a copy of the first volume, and the second volume, associates a first image in the fifth volume with the second volume, copies the differential data in the first area in the copy source storage apparatus to the second area in the copy destination storage apparatus, and associates the differential data in the second area with the second volume, to provide the second volume to the host computer.

13. The computer system according to claim 12, wherein
the copy source storage apparatus includes: a plurality of copy source volumes that are each a virtual logical volume; and a plurality of pieces of differential data associated with the plurality of copy source volumes, respectively, the plurality of copy source volumes are each associated with the first image in the first volume, the plurality of copy source volumes are associated with the plurality of pieces of differential data, respectively, the management computer selects, based on the state of the storage system, one generation processing from a plurality of generation processing including seventh generation processing and eighth generation processing as processing of generating, in the copy destination storage apparatus, a plurality of copy destination volumes each being a copy of a corresponding one of the plurality of copy source volumes, and transmits an instruction to execute the selected generation processing to the storage system, in response to an instruction to execute the seventh generation processing, the storage system generates, in the copy destination storage apparatus, a sixth volume as a copy of the first volume and the plurality of copy destination volumes each being the virtual logical volume, copies the plurality of pieces of differential data in the copy source storage apparatus to the copy destination storage apparatus, associates a first image in the sixth volume with each of the plurality of copy destination volumes, and associates the plurality of pieces of differential data in the copy destination storage apparatus with the plurality of copy destination volumes, respectively, to provide the plurality of copy destination volumes to the host computer, and in response to an instruction to execute the eighth generation processing, the storage system generates, in the copy destination storage apparatus, each of the plurality of copy destination volumes as a logical volume, copies the first image in the first volume to the plurality of copy destination volumes, and copies the plurality of pieces of differential data to the plurality of copy destination volumes, respectively, to provide the plurality of copy destination volumes to the host computer.

14. The computer system according to claim 13, wherein
the management computer:
stores capacity information on each volume in the copy source storage apparatus; and
selects, based on the capacity information, any one of the seventh generation processing and eighth generation processing, and transmits an instruction to execute the selected generation processing to the storage system.

15. The computer system according to claim 10, wherein the management computer selects, in accordance with a type of the virtual computer, one generation processing from the plurality of generation processing including the first generation processing and the second generation processing, and transmits an instruction to execute the selected generation processing to the storage system.

\* \* \* \* \*